(12) United States Patent
Higuchi et al.

(10) Patent No.: US 8,811,204 B2
(45) Date of Patent: Aug. 19, 2014

(54) NOTIFYING METHOD, AND ACCESS CONTROL DEVICE

(75) Inventors: Keisuke Higuchi, Ichinomiya (JP); Ken Nakaoka, Ichinomiya (JP); Takao Mizuguchi, Gifu (JP)

(73) Assignee: Sanyo Electric Co,. Ltd., Osaka (JP)

( * ) Notice: Subject to any disclaimer, the term of this patent is extended or adjusted under 35 U.S.C. 154(b) by 343 days.

(21) Appl. No.: 13/056,844

(22) PCT Filed: Jul. 31, 2009

(86) PCT No.: PCT/JP2009/003658
§ 371 (c)(1),
(2), (4) Date: Jan. 31, 2011

(87) PCT Pub. No.: WO2010/013493
PCT Pub. Date: Feb. 4, 2010

(65) Prior Publication Data
US 2011/0134788 A1    Jun. 9, 2011

(30) Foreign Application Priority Data

Jul. 31, 2008   (JP) .................................. 2008-198944
Jul. 31, 2008   (JP) .................................. 2008-198945

(51) Int. Cl.
*H04L 27/00*         (2006.01)

(52) U.S. Cl.
USPC ........... 370/252; 370/336; 370/329; 370/330; 455/422.1; 455/464

(58) Field of Classification Search
USPC ................................. 370/328, 350, 442, 447; 455/422.1–460, 464
See application file for complete search history.

(56) References Cited

U.S. PATENT DOCUMENTS

| | | | |
|---|---|---|---|
| 4,692,761 A * | 9/1987 | Robinton | 370/448 |
| 5,950,127 A | 9/1999 | Nitta et al. | |
| 5,995,498 A * | 11/1999 | Toot et al. | 370/332 |
| 6,175,379 B1 | 1/2001 | Uomori et al. | |
| 6,278,798 B1 | 8/2001 | Rao | |

(Continued)

FOREIGN PATENT DOCUMENTS

| | | |
|---|---|---|
| JP | 9-121376 A | 5/1997 |
| JP | 10-209956 A | 8/1998 |

(Continued)

OTHER PUBLICATIONS

Japanese Office Action, and English translation thereof, issued in Japanese Patent Application No. 2008-198944 dated Sep. 11, 2012.
Japanese Office Action, and English translation thereof, issued in Japanese Patent Application No. 2008-198945 dated Sep. 11, 2012.
International Search Report issued in International Patent Application No. PCT/JP2009/003658 dated Sep. 29, 2009.

(Continued)

*Primary Examiner* — Charles C Jiang
*Assistant Examiner* — Mohamed Kamara
(74) *Attorney, Agent, or Firm* — McDermott Will & Emery LLP

(57) ABSTRACT

It is specified in a manner such that a frame containing a first period formed by a plurality of slots and a second period having a predetermined length is repeated. A detecting unit detects a slot, which is usable for the communications between a plurality of other terminal apparatuses, from among a plurality of slots in the first period of a frame containing the first period and the second period. A modem unit and an RF unit broadcast information on the detected slot.

7 Claims, 16 Drawing Sheets

(56) References Cited

U.S. PATENT DOCUMENTS

| | | | | |
|---|---|---|---|---|
| 2001/0021655 | A1* | 9/2001 | Maeshima | 455/507 |
| 2003/0083014 | A1* | 5/2003 | Li et al. | 455/63 |
| 2006/0165113 | A1* | 7/2006 | Nonoyama | 370/442 |
| 2006/0198355 | A1* | 9/2006 | Hagiwara | 370/350 |
| 2007/0211751 | A1* | 9/2007 | Yoshikawa | 370/447 |
| 2010/0265891 | A1* | 10/2010 | Belcea | 370/328 |

FOREIGN PATENT DOCUMENTS

| | | |
|---|---|---|
| JP | 2001-358641 A | 12/2001 |
| JP | 2002-298285 A | 10/2002 |
| JP | 2003-069656 A | 3/2003 |
| JP | 2004-364069 A | 12/2004 |
| JP | 2005-167706 A | 6/2005 |
| JP | 2005-202913 | 7/2005 |
| JP | 2008-060940 | 3/2008 |

OTHER PUBLICATIONS

K. Kuramoto et al., "A real time ITS communication system for vehicle safety in intersections," IEICE Technical Report, May 22, 2006, vol. 106, No. 82, pp. 35-39, ITS2006-7.

T. Harada et al., "Inter-Vehicle Communication System with Decentralized TDMA Protocol for Safety Driving," IPSJ SIG Notes, Nov. 22, 2007, vol. 2007, No. 116, pp. 129-136, 2007-MBL-43(17), 2007-ITS-31(17).

H. Tanaka et al., "2GHz-Band Radio Propagation in Microcellular Mobile Radio Environments for Low Building Area," IEICE Technical Report, Sep. 16, 1992, vol. 92, No. 212, pp. 45-51, CS92-40.

Transmittal of International Preliminary Report on Patentability, w/ English translation thereof, issued in International Patent Application No. PCT/JP 2009/003658 dated Feb. 10, 2011.

United States Office Action issued in U.S. Appl. No. 12/986,530 dated Aug. 23, 2012.

* cited by examiner

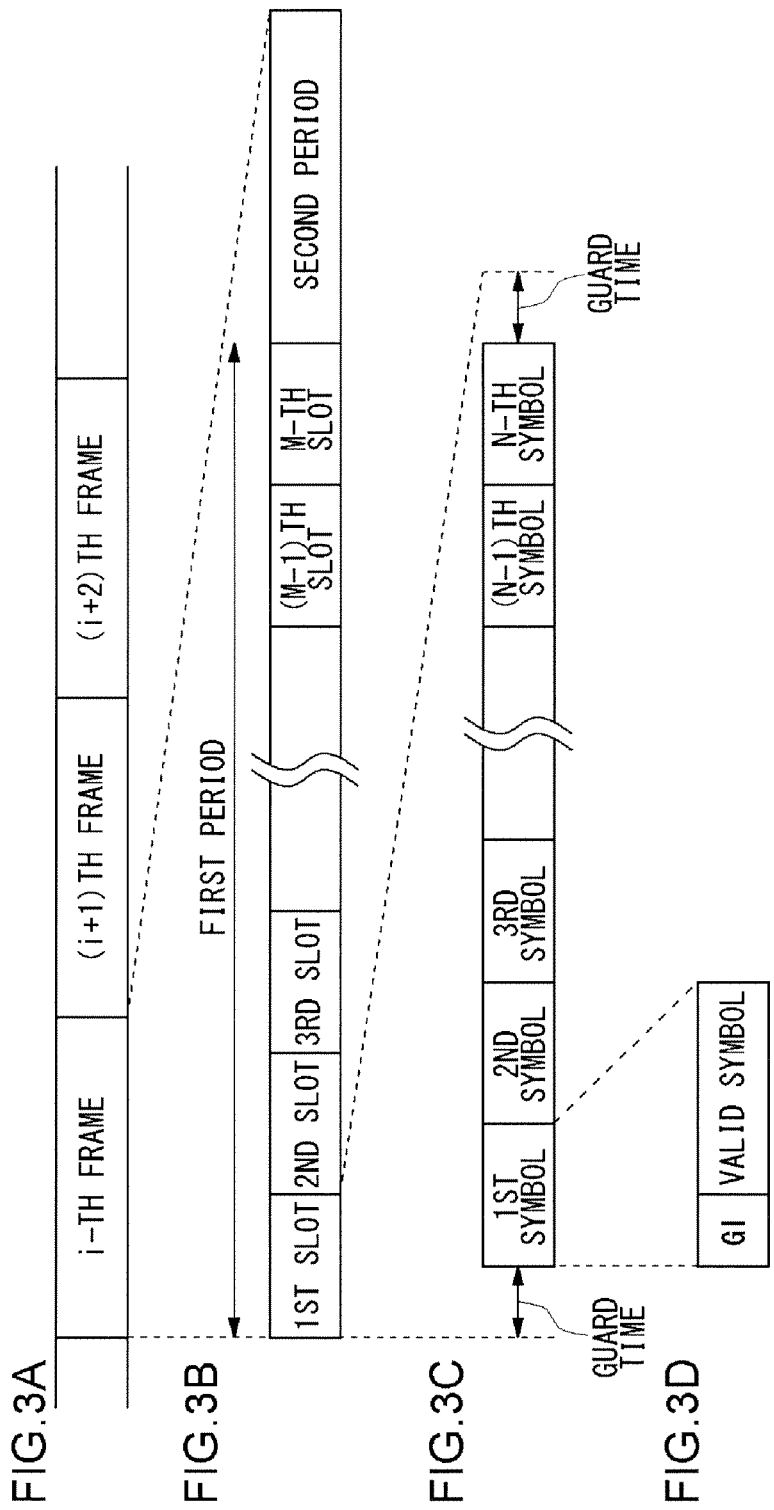

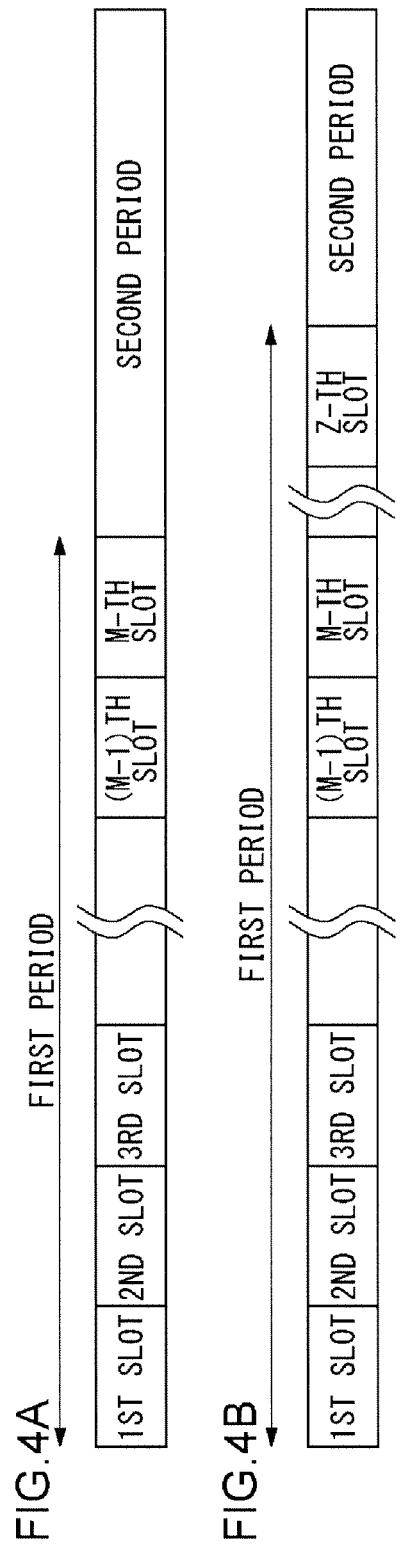

FIG.5A

| | | | | | | | | |
|---|---|---|---|---|---|---|---|---|
| 31 | N | N | N | -1 | D | D | D |
| 30 | N | N | N | -2 | N | N | N |
| 29 | N | N | N | -3 | D | D | D |
| 28 | N | N | N | -4 | D | D | D |
| 27 | N | N | N | -5 | D | D | D |
| 26 | D | D | D | -6 | D | D | D |
| 25 | D | D | D | -7 | P | P | P |
| 24 | D | D | D | -8 | D | D | D |
| 23 | D | D | D | -9 | D | D | D |
| 22 | D | D | D | -10 | D | D | D |
| 21 | P | P | P | -11 | D | D | D |
| 20 | D | D | D | -12 | D | D | D |
| 19 | D | D | D | -13 | D | D | D |
| 18 | D | D | D | -14 | D | D | D |
| 17 | D | D | D | -15 | D | D | D |
| 16 | D | D | D | -16 | D | D | D |
| 15 | D | D | D | -17 | D | D | D |
| 14 | D | D | D | -18 | D | D | D |
| 13 | D | D | D | -19 | D | D | D |
| 12 | D | D | D | -20 | D | D | D |
| 11 | D | D | D | -21 | P | P | P |
| 10 | D | D | D | -22 | D | D | D |
| 9 | D | D | D | -23 | D | D | D |
| 8 | D | D | D | -24 | D | D | D |
| 7 | P | P | P | -25 | D | D | D |
| 6 | D | D | D | -26 | N | N | N |
| 5 | D | D | D | -27 | N | N | N |
| 4 | D | D | D | -28 | N | N | N |
| 3 | D | D | D | -29 | N | N | N |
| 2 | N | N | N | -30 | N | N | N |
| 1 | D | D | D | -31 | N | N | N |
| 0 | N | N | N | -32 | N | N | N |

| | | | | | | | |
|---|---|---|---|---|---|---|---|
| 31 | N | N | N | -1 | N | N | N |
| 30 | N | N | N | -2 | N | N | N |
| 29 | N | N | N | -3 | D | D | D |
| 28 | N | N | N | -4 | D | D | D |
| 27 | N | N | N | -5 | D | D | D |
| 26 | D | D | D | -6 | D | D | D |
| 25 | D | D | D | -7 | P | P | P |
| 24 | D | D | D | -8 | D | D | D |
| 23 | D | D | D | -9 | D | D | D |
| 22 | D | D | D | -10 | D | D | D |
| 21 | P | P | P | -11 | D | D | D |
| 20 | D | D | D | -12 | D | D | D |
| 19 | D | D | D | -13 | D | D | D |
| 18 | D | D | D | -14 | D | D | D |
| 17 | D | D | D | -15 | D | D | D |
| 16 | D | D | D | -16 | D | D | D |
| 15 | D | D | D | -17 | D | D | D |
| 14 | D | D | D | -18 | D | D | D |
| 13 | D | D | D | -19 | D | D | D |
| 12 | D | D | D | -20 | D | D | D |
| 11 | D | D | D | -21 | P | P | P |
| 10 | D | D | D | -22 | D | D | D |
| 9 | D | D | D | -23 | D | D | D |
| 8 | D | D | D | -24 | D | D | D |
| 7 | P | P | P | -25 | D | D | D |
| 6 | D | D | D | -26 | N | N | N |
| 5 | D | D | D | -27 | N | N | N |
| 4 | D | D | D | -28 | N | N | N |
| 3 | D | D | D | -29 | N | N | N |
| 2 | N | N | N | -30 | N | N | N |
| 1 | N | N | N | -31 | N | N | N |
| 0 | N | N | N | -32 | N | N | N |

...

NOTIFYING METHOD, AND ACCESS CONTROL DEVICE

RELATED APPLICATIONS

This application is the U.S. National Phase under 35 U.S.C. §371 of International Application No. PCT/JP2009/003658, filed on Jul. 31, 2009, which in turn claims the benefit of Japanese Application Nos. 2008-198944, filed on Jul. 31, 2008, and 2008-198945, filed Jul. 31, 2008, the disclosures of which Applications are incorporated by reference herein.

TECHNICAL FIELD

The present invention relates to an annunciation (broadcasting) technology and, more particularly, to a broadcasting method for sending signals containing predetermined information and an access control apparatus therefor.

BACKGROUND TECHNOLOGY

Road-to-vehicle communication has been under investigation in an effort to prevent collision accidents of vehicles on a sudden encounter at an intersection. In a road-to-vehicle communication, information on conditions at an intersection is communicated between a roadside unit and an on-board equipment. Such a road-to-vehicle communication requires installation of roadside units, which means a great cost of time and money. In contrast to this, a vehicle-to-vehicle (inter-vehicular) communication, in which information is communicated between on-board equipments, has no need for installation of roadside units. In that case, current position information is detected in real time by GPS (Global Positioning System) or the like and the position information is exchanged between the on-board equipments. Thus it is determined on which of the roads leading to the intersection the driver's vehicle and the other vehicles are located (See Patent Document 1, for instance).

PRIOR ART DOCUMENTS

Patent Documents

[Patent Document 1] Japanese Unexamined Patent Application Publication No. 2005-202913.

Used in wireless LANs (Local Area Networks) conforming to standards, such as IEEE 802.11, is an access control function called Carrier Sense Multiple Access with Collision Avoidance (CSMA/CA). In such a wireless LAN, therefore, the same wireless channel is shared by a plurality of terminal apparatuses. Such CSMA/CA is subject to conditions involving mutual wireless signals not reaching the targets, namely, carrier sense not functioning, due to the effects of distance between the terminal apparatuses or obstacles attenuating the radio waves and so forth. When the carrier sense does not function, there occur collisions of packet signals transmitted from a plurality of terminal apparatuses. Also, wireless LANs employ the OFDM modulation scheme to achieve faster communication speed.

On the other hand, when a wireless LAN is applied to the inter-vehicular communication, a need arises to transmit information to a large indefinite number of terminal apparatuses, and therefore it is desirable that signals be sent by broadcast. Yet, at an intersection or like places, an increase in the number of vehicles, that is, the number of terminal apparatuses, is considered to cause an increase in the collisions of the packet signals therefrom. In consequence, data contained in the packet signals may not be transmitted to the other terminal apparatuses. If such a condition occurs in the inter-vehicular communication, then the objective of preventing collision accidents of vehicles on a sudden encounter at an intersection will not be attained.

The present invention has been made in view of the foregoing circumstances, and the purpose thereof is to provide a technology for reducing the collision probability of packet signals under conditions of increased volume of communication.

Means for Solving the Problems

In order to resolve the above problems, an access control apparatus according to one embodiment of the present invention controls communications between terminal apparatuses, and the access control apparatus comprises: a detecting unit configured to detect a slot, which is usable for the communications between terminal apparatuses, from among a plurality of slots in a first period of a frame containing the first period and a second period, wherein it is specified in a manner such that the frame containing the first period formed by the plurality of slots and the second period having a predetermined length is repeated; and a broadcasting unit configured to broadcast information on the slot detected by the detecting unit.

Another embodiment of the present invention relates also to an access control apparatus. The apparatus controls communications between terminal apparatuses, and the access control apparatus comprises: a detecting unit configured to detect a slot, which is usable for the communications between terminal apparatuses, from among a plurality of slots in a first period of a frame containing the first period and a second period, wherein it is specified in a manner such that the frame containing the first period formed by the plurality of slots and the second period having a predetermined length is repeated; and a broadcasting unit configured to broadcast information on the slot detected by the detecting unit. The broadcasting unit broadcasts information on a terminal apparatus which is to use the plurality of slots in the first period, of a frame containing the first period and the second period, as well as the information on the slot.

Still another embodiment of the present invention relates to a broadcasting method. The method is employed in an access control apparatus for controlling communications between terminal apparatuses, and the method comprises: detecting a slot, which is usable for the communications between terminal apparatuses, from among a plurality of slots in a first period of a frame containing the first period and a second period, wherein it is specified in a manner such that the frame containing the first period formed by the plurality of slots and the second period having a predetermined length is repeated; and broadcasting information on the slot detected.

Still another embodiment of the present invention relates also to a broadcasting method. The method is employed in an access control apparatus for controlling communications between terminal apparatuses, and the method comprises: detecting a slot, which is usable for the communications between terminal apparatuses, from among a plurality of slots in a first period of a frame containing the first period and a second period, wherein it is specified in a manner such that the frame containing the first period formed by the plurality of slots and the second period having a predetermined length is repeated; and broadcasting information on the slot detected, wherein the broadcasting broadcasts information on a terminal apparatus which is to use the plurality of slots in the first period, of a frame containing the first period and the second period, as well as the information on the slot.

Optional combinations of the aforementioned constituting elements, and implementations of the invention in the form of methods, apparatuses, systems, recording media, computer programs and so forth may also be practiced as additional modes of the present invention.

Effect of the Invention

The present invention reduces the collision probability of packet signals under conditions of increased volume of communication.

BRIEF DESCRIPTION OF THE DRAWINGS

FIGS. 3A to 3D show formats of frames specified by a frame specifying unit of FIG. 2.

FIGS. 4A and 4B show another formats of frames specified by a frame specifying unit of FIG. 2.

FIGS. 5A and 5B each shows a format of OFDM symbol used in the communication system of FIG. 1.

BEST MODE FOR CARRYING OUT THE INVENTION

Figure 1:
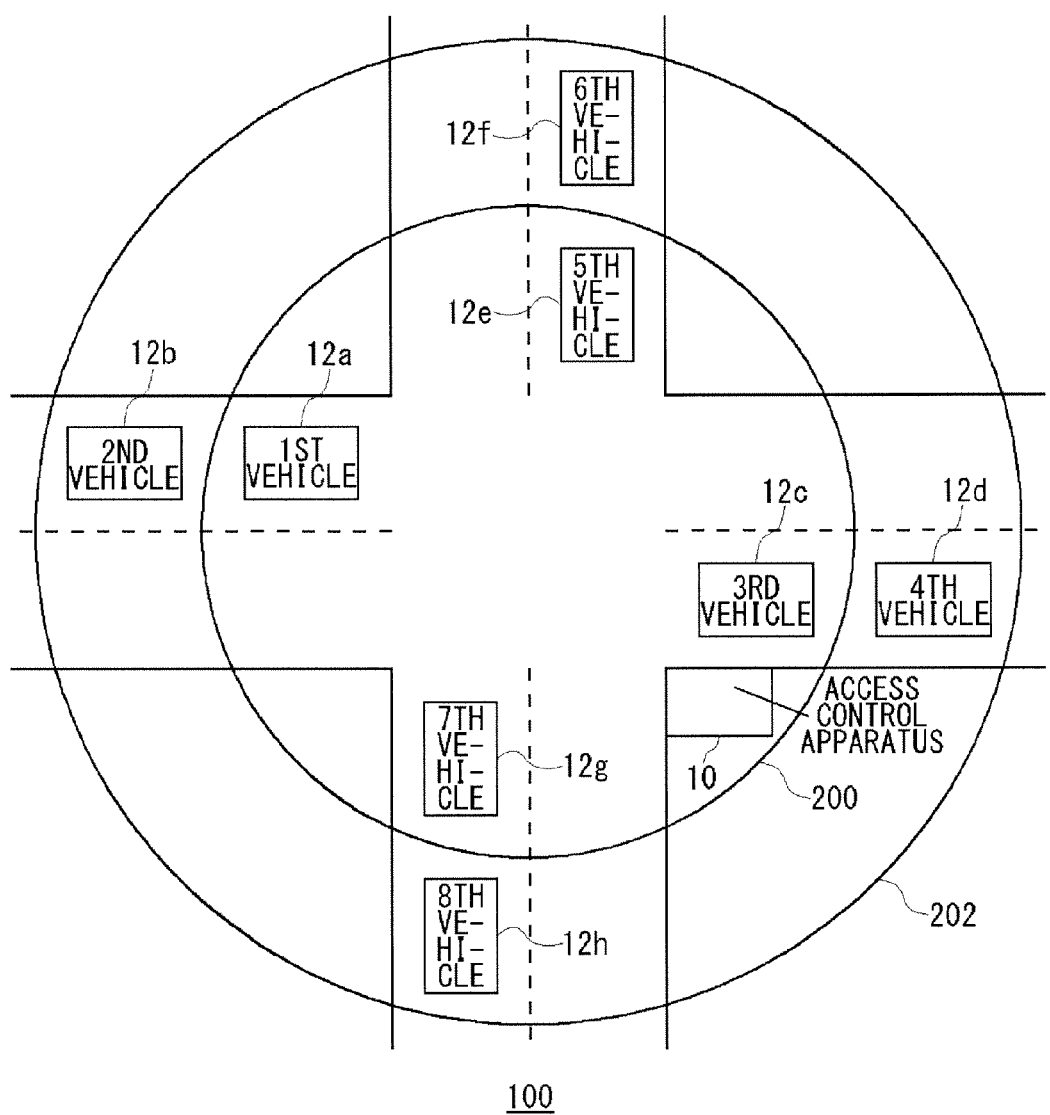
FIG. 1 shows a structure of a communication system according to an exemplary embodiment of the present invention.

The present invention will be outlined before it is explained in detail. Exemplary embodiments of the present invention relate to a communication system carrying out data communication between terminal apparatuses installed in vehicles. A terminal apparatus transmits, by broadcast, packet signals containing information such as the traveling speed and position of a vehicle (hereinafter referred to as "data"). And the other terminal apparatuses receive the packet signals and recognize the approach or the like of the vehicle based on the data. Note here that the terminal apparatuses employ the OFDM modulation scheme to achieve faster communication speed. Under these circumstances, an increase in the number of terminal apparatuses at an intersection or like place increases the probability of packet signals occurring. To cope with it, the communication system according to the present exemplary embodiment executes the following processes.

The communication system according to the present exemplary embodiment includes an access control apparatus in addition to a plurality of terminal apparatuses, and the access control apparatus is installed at an intersection, for instance. The access control apparatus repeatedly specifies a frame formed by a first period and a second period. Here, the first period contains a plurality of slots. The access control apparatus identifies slots not used in communication among a plurality of terminal terminals (hereinafter referred to as "empty slots" or "unused slots") by measuring the received power in each slot in the first period. Also, the access control apparatus adds frame constituent information and information on the identified slots to control information and transmits, by broadcast, a packet signal containing the control information (hereinafter referred to sometimes as "control information" also) using a single slot. It is to be understood here that the single slot is one determined beforehand. A terminal apparatus selects any of the empty slots based on the control information and transmits, by broadcast, a packet signal containing data (hereinafter referred to sometimes as "data" also) using the selected slot. Note that the terminal apparatus, when transmitting data over a plurality of frames, uses the same slots in corresponding timing in each frame.

The access control apparatus identifies slots having any collision (hereinafter referred to as "collision slots") by measuring in each slot for any collision of packet signals transmitted by a plurality of terminal apparatuses. The access control apparatus also adds information on the identified slots to the control information. A terminal apparatus checks for the presence of any collision in the already used slots, based on the control information. When there is any collision, the terminal apparatus selects any one of the other empty slots, based on the control information. Note here that the access control apparatus has no direct involvement in data communication between terminal apparatuses, that is, the access control apparatus does not directly specify the slot to be used in the data communication. In other words, the access control apparatus monitors the condition of data communication between terminal apparatuses and keeps broadcasting information on unused slots and collision slots.

It is to be noted that since the control information is also transmitted in a single slot, there are chances that the data transmitted from a terminal apparatus incapable of receiving the control information may collide with the control information. In consequence, if the other terminal apparatuses cannot receive the control information, then there arises a difficulty of carrying out the aforementioned processes. To cope with this situation, the OFDM signals used in transmitting data have some of the subcarriers as null carriers in which no data is contained (these subcarriers being hereinafter referred to as "identification carriers"). On the other hand, the OFDM signals used in transmitting control information have signals placed in the identification carriers, too. Hence, even when there is a collision between data and control information, the terminal apparatus can detect the presence of control information by observing the signal components of the identification carrier.

Also, as the number of terminal apparatuses is larger as compared with the number of slots contained in the first period, it is possible that the number of empty slots gets smaller and therefore the collision is more likely to occur. On the other hand, from the viewpoint of preventing the traffic accidents, it can be said that the data transmitted from a terminal apparatus located closer to the intersection is more important than the data transmitted from a terminal apparatus located far from the intersection. In view of the above points, the access control apparatus has the terminal apparatuses located closer to the terminal apparatus use the slots in the first period and has the terminal apparatus located far from the intersection perform CSMA/CA in the second period. As a result, the collision probability in the first period becomes lower than that in the second period and therefore the increase in the collision probability for important data is suppressed. Also, the access control apparatus adjusts the length of first period, namely the number of slots contained in the first period, according to the number of terminals located close to the intersection.

FIG. 1 shows a structure of a communication system 100 according to an exemplary embodiment of the present invention. FIG. 1 corresponds to a case thereof at an intersection viewed from above. The communication system 100 includes an access control apparatus 10 and a first vehicle 12a, a second vehicle 12b, a third vehicle 12c, a fourth vehicle 12d, a fifth vehicle 12e, a sixth vehicle 12f, a seventh vehicle 12g, and an eighth vehicle 12h, which are generically referred to as "vehicle 12" or "vehicles 12". It is to be noted that each vehicle 12 has a not-shown terminal apparatus installed therein. Also, a first area 200 and a second area 202 are formed by the access control apparatus 10. The second area 202 is formed outside the first area 200, with the intersection as the center As shown in FIG. 1, a road extending in the horizontal, or left-right, direction and a road extending in the vertical, or up-down, direction in FIG. 1 intersect with each other in the central portion thereof. Note here that the upper side of FIG. 1 corresponds to the north, the left side thereof the west, the down side thereof the south, and the right side thereof the east. And the portion where the two roads intersect each other is the intersection. The first vehicle 12a and the second vehicle 12b are advancing from left to right, while the third vehicle 12c and the fourth vehicle 12d are advancing from right to left. Also, the fifth vehicle 12e and the sixth vehicle 12f are advancing downward, while the seventh vehicle 12g and the eighth vehicle 12h are advancing upward.

The terminal apparatus installed in each of the vehicles 12 acquires data and transmits, by broadcast, a packet signal containing the data. Here, before explaining exemplary embodiments of the present invention, a description will be given of an operation of a terminal apparatus which is compatible with a known wireless LAN, i.e., CSMA/CA. Each terminal apparatus transmits data by broadcast when it has determined by executing carrier sense that transmission is possible. Consequently, there are chances of data from a plurality of terminal apparatuses colliding with each other. Also, as the number of terminal apparatuses increases, there will be greater probability of collisions occurring. In particular, at locations like intersections, the likelihood of data collision is greater despite the fact that the likelihood of vehicles 12 colliding with each other is also great. This means failed utilization of data in spots where data is in the greatest demand.

Therefore, the communication system 100 places an access control apparatus 10 at each intersection. The access control apparatus 10 generates a frame containing a plurality of slots repeatedly based on the signals received from not-shown GPS satellites. Here, each frame is formed by a first period and a second period wherein the first period contains a plurality of slots. Also, the access control apparatus 10 identifies empty slots and collision slots out of the plurality of slots. The method for identifying the empty slots and collision slots will be discussed later. The access control apparatus 10 adds information on the identified empty slots and collision slots to control information. Further, the access control apparatus 10 broadcasts the control information, using a predetermined slot. For example, the access control apparatus 10 broadcasts the control information, using the leading slot of each first period.

A plurality of terminal apparatuses existent in the first area 200 formed by the access control apparatus 10 receive the control information broadcast by the access control apparatus 10 and selects one of the empty slots. Also, each terminal apparatus broadcasts data, using a selected slot. Note here that the terminal apparatus broadcasts the data, using a slot corresponding to the selected slot for a plurality of frames. For example, when a tenth slot from the top of the first period has been selected, it is the tenth slot from the top of the first period that must be used for the next frame also. It is to be noted that when there is an indication in control information that the slot being used is a collision slot, the terminal apparatus further selects another empty slot. The terminal apparatus repeats the above-described processing for the duration in which the terminal apparatus is located in the first area 200.

At the same time, a plurality of terminal apparatuses existent in the second area 202 formed by the access control apparatus 10 perform communications in the second period using CSMA/CA. Note here that the use of a terminal apparatus which is to communicate in the first period and the use of a terminal apparatus which is to communicate in the second period are instructed by and transmitted from the access control apparatus 10. The access control apparatus 10 adjusts the length of first period in a frame, according to the number of terminal apparatuses present in the first area 200. The terminal apparatus repeats the above-described processing for the duration in which the terminal apparatus can receive the control information broadcast by the access control apparatus 10. In other words, the terminal apparatus watches for control information and detects its entry in the second area 202 when the terminal apparatus has received the control information. Also, the terminal apparatus detects its entry in the first area 200, based on a parameter sent from the access control apparatus 10. It is to be appreciated that the terminal apparatus may broadcast data even when the terminal apparatus is not receiving control information. The terminal apparatus which has received data from the other terminal apparatuses recognizes, based on the data, the presence of vehicles 12 that are carrying the other terminal apparatuses.

Note here that both the control information broadcast from the access control apparatus 10 and the data broadcast from the terminal apparatuses use OFDM signals. However, it is not the same subcarriers in which the control information and the data are placed. The data is not placed in the aforementioned identification carriers. On the other hand, identification information is placed not only in the subcarriers where the data is placed but also in the identification carriers. As a result, even when there is a collision between data and identification information, the terminal apparatus can detect the presence of control information by observing the signal components of identification carriers. It should be noted that the aforementioned detection of entry into the second area 202 by the terminal apparatus may be made relative to the identification carriers.

Figure 2:
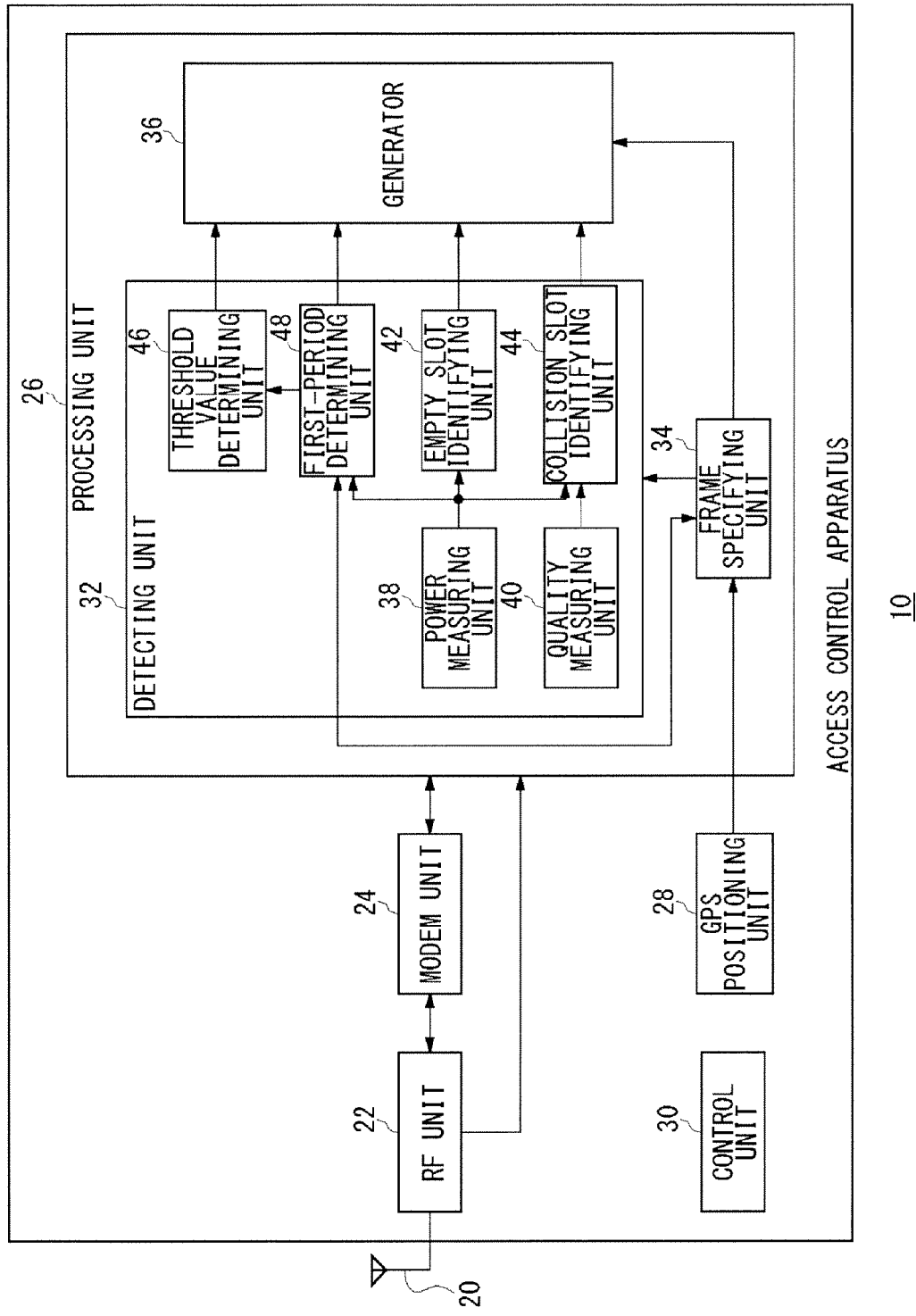
FIG. 2 shows a structure of an access control apparatus of FIG. 1.

FIG. 2 shows a structure of the access control apparatus 10. The access control apparatus 10 includes an antenna 20, an RF unit 22, a modem unit 24, a processing unit 26, a GPS positioning unit 28, and a control unit 30. The processing unit 26 includes a detecting unit 32, a frame specifying unit 34, and a generator 36. The detecting unit 32 includes a power measuring unit 38, a quality measuring unit 40, an empty slot identifying unit 42, a collision slot identifying unit 44, a threshold value determining unit 46, and a first-period determining unit 48.

The GPS positioning unit 28 receives signals from not-shown GPS satellites and acquires information on the time of day based on the received signals. It should be noted that known art can be used for the acquisition of information on the time of day and therefore the description thereof is omitted here. The GPS positioning unit 28 outputs the information on the time of day to the frame specifying unit 34. The frame specifying unit 34 acquires information on the time of day from the GPS positioning unit 28. The frame specifying unit 34 generates a plurality of frames based on the information on the time of day. For example, the frame specifying unit 34 generates ten "100 msec" frames by dividing a duration of "1 sec" into 10 parts from the timing of "0 msec". Frames are thus defined and specified repeatedly through the repetition of this process.

Also, the frame specifying unit 34 divides each frame into the first period and the second period. A description will be given later of the lengths of first period and second period. The frame specifying unit 34 generates a plurality of slots by dividing the first period into a plurality of parts. For example, when the first period is "50 msec" long and each slot is "500 µsec" long, 100 slots are generated. In such a case, the second period is defined as a period having a predetermined length such as "50 msec". As previously indicated, since the communication system 100 employs the OFDM modulation scheme, each slot is so specified as to be composed of a plurality of OFDM symbols. Also, an OFDM symbol comprises a guard interval (GI) and a valid symbol. Note that a guard time may be provided in the front portion and the rear portion of each slot. It is to be noted also that a certain group of or combination of a plurality of OFDM symbols contained in a slot is equivalent to the packet signal mentioned earlier.

FIGS. 3A to 3D show the formats of frames specified by the frame specifying unit 34. FIG. 3A shows a structure of frames. As shown in FIG. 3A, a plurality of frames, such as i-th frame to (i+2)th frame, are so specified as to be repeated. Also, the duration of each frame is "100 msec", for instance. FIG. 3B shows a structure of a single frame. As shown in FIG. 3B, a single frame consists of a first period and a second period, and the first period consists of M units of slots. For example, the duration of each slot is "500 sec". FIG. 3C shows a structure of a single slot. As shown in FIG. 3C, a guard time is provided in the front portion and the rear portion of each slot. And the remaining duration of the slot consists of N units of OFDM symbols. FIG. 3D shows a structure of each OFDM symbol. As shown in FIG. 3D, each OFDM symbol consists of a GI and a valid symbol. Let us now refer back to FIG. 2.

The RF unit 22 receives through the antenna 20 a packet signal transmitted in communication between the other terminal apparatuses (not shown) in each slot of the first period or the second period, as a receiving processing. The RF unit 22 performs a frequency conversion on the packet signal of a radiofrequency received through the antenna 20 and thereby generates a packet signal of baseband. Further, the RF unit 22 outputs the baseband packet signal to the modem unit 24. Generally, a baseband packet signal is formed of an in-phase component and a quadrature component, and therefore it should be represented by two signal lines. However, it is represented by a single signal line here to make the illustration clearer for understanding.

Also, the RF unit 22 includes an LNA (Low Noise Amplifier), a mixer, an AGO unit, and an A-D conversion unit. The RF unit 22 performs a frequency conversion on the baseband packet signal inputted from the modem unit 24 and thereby generates a radiofrequency packet signal in each slot of the first period or the second period as a transmission processing. Further, the RF unit 22 transmits, through the antenna 20, the radiofrequency packet signal. The RF unit 22 also includes a PA (Power Amplifier), a mixer, and a D-A conversion unit.

The modem unit 24 demodulates the radiofrequency packet signal fed from the RF unit 22, as a receiving processing. Further, the modem unit 24 outputs the demodulation result to the processing unit 26. Also, the modem unit 24 modulates the data fed from the processing unit 26, as a transmission processing. Further, the modem unit 24 outputs the modulation result to the RF unit 22 as a baseband packet signal. It is to be noted here that the communication system 100 is compatible with the OFDM modulation scheme and therefore the modem unit 24 performs FFT (Fast Fourier Transform) as a receiving processing and performs IFFT (Inverse Fast Fourier Transform) as a transmission processing also.

The power measuring unit 38 receives a received signal from the RF unit 22 or the modem unit 24 and measures the received power. The received power herein is measured slot by slot. Hence, the power measuring unit 38 measures the received power for each of the plurality of slots. The power measuring unit 38 outputs the received power for each slot to the empty slot identifying unit 42, the first-period determining unit 48 and the collision slot identifying unit 44. The quality measuring unit 40 receives the demodulation result from the modem unit 24 and measures the signal quality for each of the plurality of slots. The signal quality measured herein is the error rate. It should be noted that known art can be used for the measurement of the error rate, so that the description thereof is omitted here. Also, instead of the error rate, EVM (Error Vector Magnitude) or the like may be measured as the signal quality. The quality measuring unit 40 outputs the error rate to the collision slot identifying unit 44.

The empty slot identifying unit 42 receives the received power for each slot from the power measuring unit 38. The empty slot identifying unit 42 compares each received power against a threshold value (hereinafter referred to as "threshold value for empty slot") and identifies the slot for which the received power is smaller than the threshold value for empty slot. That is, the empty slot identifying unit 42 detects, from among a plurality of slots in the first period of a frame containing the first period and the second period, a slot that can be used in communication between a plurality of terminal apparatuses, as an empty slot. Note here that when there are a plurality of empty slots, the empty slot identifying unit 42 identifies them as empty slots. The empty slot identifying unit 42 outputs information on the identified empty slots to the generator 36.

The collision slot identifying unit 44 receives the received power for each slot from the power measuring unit 38 and receives the error rate for each slot from the quality measuring unit 40. Also, the collision slot identifying unit 44 associates the received power with the error rate, slot by slot. The collision slot identifying unit 44 compares not only the received power against a first threshold value, but also the error rate against a second threshold value, slot by slot. The collision slot identifying unit 44 identifies, as a collision slot, a slot for which the received power is larger than the first threshold value and at the same time the error rate is higher than the second threshold value. That is, the collision slot identifying unit 44 recognizes, as a collision slot, a slot for which the received power is large but the communication quality is inferior. In this manner, the collision slot identifying unit 44 detects, as a collision slot, a slot in which a collision has occurred due to duplicate transmission of signals sent from a plurality of terminal apparatuses, from the plurality of slots in the first period of a frame containing the first period and the second period. The collision slot identifying unit 44 outputs information on the identified collision slots to the generator 36.

The first-period determining unit 48 receives the received power for each slot from the power measuring unit 38. Also, the first-period determining unit 48 accumulates the received powers over the first period. In other words, the first-period determining unit 48 accumulates, over at least a partial period of frame, the received powers of signal in the communications between a plurality of other terminal apparatuses. The accumulated value is presumed to be the number of terminal apparatuses actually transmitting data in the first period or the number of terminal apparatuses trying to transmit data in the first period. That is, it is presumed that the larger the accumulated value is, the greater the number of terminal apparatuses will be. The first-period determining unit 48 determines the length of first period based on the accumulated value.

For example, the first-period determining unit 48 may determine a period determining threshold value for each of a plurality of levels. In such a case, the first-period determining unit 48 compares the accumulated value with those threshold values and thereby selects the maximum value among those exceeding the accumulated value. On the other hand, each of the period determining threshold values for the plurality of levels are associated beforehand with the length of first period, and the first-period determining unit 48 determines the length of first period, corresponding to the selected maximum value, which is also the length of first period in each frame. Note that the maximum value and the minimum value may be set in the first period. Assume that the period of each frame is fixed. The first-period determining unit 48 outputs the length of first period to the generator 36, the threshold value determining unit 46 and the frame specifying unit 34.

The frame specifying unit 34 adjusts the length of first period in a frame, namely the number of slots in a frame, in response to a notification received from the first-period determining unit 48. FIGS. 4A and 4B show another formats of frames specified by the frame specifying unit 34. Similar to FIG. 3B, in FIG. 4A the first period consists of M units of slots. On the other hand, FIG. 4B shows a frame format in a case where the first-period determining unit 48 identifies that the number of terminal apparatuses is larger than that of FIG. 4A. The first period in FIG. 4B is longer than the first period in FIG. 4A and therefore the first period in FIG. 4B contains a greater number of slots than the first period does in FIG. 4A. In FIG. 4B, the first period contains Z units of slots where Z>M. Accordingly, the second period shown in FIG. 4B is shorter than the second period shown in FIG. 4A. Let us now refer back to FIG. 2.

The threshold value determining unit 46 determines a threshold value for the received power in a case where a not-shown terminal apparatus has received the control information (hereinafter this threshold value will be referred to as "area determining threshold value"). An operation in the not-shown terminal apparatus is herein explained briefly to clarify the function of the area determining threshold value. Upon receipt of the control information, the terminal apparatus measures the received power of the control information. Also, the terminal apparatus extracts the area determining threshold value from the control information and then compares the received power against the area determining threshold value. If the received power is larger than the area determining threshold value, the terminal apparatus will determine the use of any of the plurality of slots in the first period of a frame containing the first period and the second period. If, on the other hand, the received power is not larger than the area determining threshold value, the terminal apparatus will determine the use of the second period.

Here, the threshold value determining unit 46 determines a predetermined value as the area determining threshold value. The threshold value determining unit 46 changes the area determining threshold value when the length of first period becomes maximum. This process of changing the area determining threshold value is explained based on FIG. 1. As the number of terminal apparatuses existent within the first area 200 creases, the first-period determining unit 48 extends the length of first period. If the number of terminal apparatuses increases even when the length of first period becomes maximum, the threshold value determining unit 46 will increase the area determining threshold value. This is equivalent to reducing the first area 200. If, on the other hand, the number of terminal apparatuses existent within the first area 200 decreases, the similar processing will be performed but the description thereof is omitted here.

To achieve the above-described processing, the threshold value determining unit 46 may receive the accumulated value from the first-period determining unit 48. Also, the threshold value determining unit 46 defines beforehand a correspondence between the accumulated values and the area determining threshold values. The threshold value determining unit 46 determines the area determining threshold value from the received accumulated value, based on said correspondence therebetween. The threshold value determining unit 46 outputs the area determining threshold value to the generator 36.

The generator 36 receives information on empty slots from the empty slot identifying unit 42 and also receives information on collision slots from the collision slot identifying unit 44. The generator 36 also receives the length of first period from the first-period determining unit 48 and receives the area determining threshold value from the threshold value determining unit 46. The generator 36 generates control information by adding the information on empty slots, the information on collision slots, the length of first period and the area determining threshold value thereto. The area determining threshold value may be thought of as a parameter on a terminal apparatus that is to use a plurality of slots in the first period of a frame containing the first period and the second period. Note here that the numbers, 1, 2, . . . from the start (hereinafter referred to as "slot numbers") are given respectively to a plurality of slots contained in a frame. The generator 36 adds the slot number(s) of the empty slot(s) contained in the previous frame(s) as information on empty slots to the control information.

Also, the generator 36 adds the slot number(s) of the collision slot(s) contained in the previous frame(s) as information on collision slots to the control information. Further, the generator 36 receives information on frames, first periods and slots from the frame specifying unit 34 and periodically assigns the control information to one slot contained in each first period. The generator 36 assigns the control information to the slot with slot number "1", or the leading slot of each frame, which is predetermined herein. The generator 36 outputs the control information to the modem unit 24, using the thus assigned slot.

As described above, the communication system 100 is compatible with the OFDM modulation scheme and therefore the generator 36 generates the control information as an OFDM signal. Note here that the OFDM signals are also used for the communications between a not-shown plurality of terminal apparatuses. A description is given herein by comparing an OFDM signal that has the control information assigned (hereinafter this is called "control information" also) with an OFDM signal that has data assigned (hereinafter this is called "data" also). FIGS. 5A and 5B illustrate formats of OFDM symbols used in the communication system 100. FIG. 5A corresponds to control information, whereas FIG. 5B corresponds to data.

In both FIG. 5A and FIG. 5B, the vertical direction represents the frequency, whereas the horizontal direction represents time. The numbers "31", "30", "−32" are indicated from top along the vertical direction, and these are the numbers assigned to identify subcarriers (hereinafter referred to as "subcarrier numbers"). In OFDM signals, the frequency of a subcarrier whose subcarrier number is "31" is the highest, whereas the frequency of a subcarrier whose subcarrier number is "−32" is the lowest. In FIG. 5A and FIG. 5B, "D" corresponds to a data symbol, "P" a pilot symbol, and "N" a null.

What are common to the control information and the data are the subcarrier numbers "31" to "27", "2", "0", and "−2", and the subcarrier numbers "−26" to "−32" which are all null. Of the control information, the subcarrier numbers "26" to "3", "−3" to "−25" are also used in data, and the use of symbols is the same for both the control information and the data. of the control information, on the other hand, the subcarrier numbers "1" and "−1" are not used for data. These correspond to the aforementioned identification carriers. That is, the identification carrier is assigned to a subcarrier near the center frequency of an OFDM signal. Of the control information, a guard band is provided between a subcarrier used also for data and the identification carrier, namely between the subcarrier number "2" and the subcarrier number "−2". The subcarriers of the subcarrier number "−2" through the subcarrier number "2" may be collectively called "identification carrier" or "identification carriers".

The generator 36 assigns the information on empty slots and the information on collision slots to subcarriers other than the identification carriers of the control information. Also, the generator 36 assigns the information on frames to the identification carrier. Also, the generator 36 may preferentially assign not only these items of information but also information having higher degrees of importance to the identification carrier. Examples of items of information contained in the control information are the latitude and longitude, the size of the first period and the area determining threshold value. Also, a known signal is assigned to an OFDM symbol which is located anterior to the packet signal. Such a known signal is used for AGC or used to estimate the channel characteristics. The generator 36 may assign a known signal to the identification carrier over a partial period of a predetermined slot. Such a known signal is used as a unique word (UW), for example. Let us now refer back to FIG. 2.

The modem unit 24 and the RF unit 22 broadcast the control information generated in the generator 36 from the antenna 20. A terminal apparatus, which uses slots corresponding to the information on empty slots and information on the collision slots both contained in the control information, uses slots corresponding to said slots over a plurality of frames. For example, a slot whose slot number is "10" is used continuously. The control unit 30 controls the entire processing of the access control apparatus 10.

These structural components may be implemented hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

Figure 6:
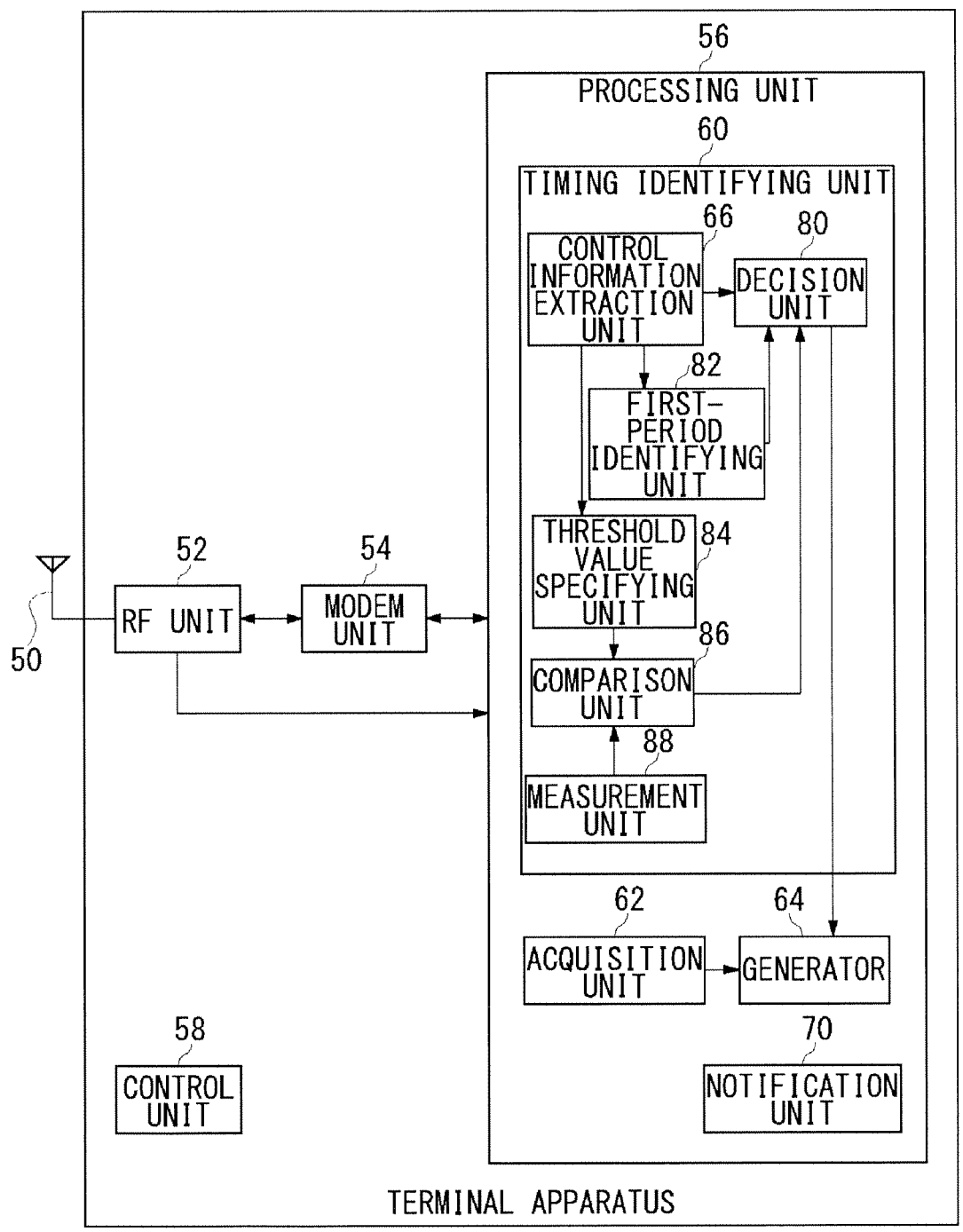
FIG. 6 shows a structure of a terminal apparatus mounted on a vehicle of FIG. 1.

FIG. 6 shows a structure of a terminal apparatus 14 mounted on a vehicle 12. The terminal apparatus 14 includes an antenna 50, an RF unit 52, a modem unit 54, a processing unit 56, and a control unit 58. The processing unit 56 includes a timing identifying unit 60, an acquisition unit 62, a generator 64, and a notification unit 70. The timing identifying unit 60 includes a control information extraction unit 66 and a decision unit 80, a first-period identifying unit 82, a threshold value specifying unit 84, and a comparison unit 86, and a measurement unit. The antenna 50, the RF unit 52 and the modem unit 54 carry out the processings similar to those carried out by the antenna 20, the RF unit 22 and the modem unit 24 of FIG. 2, respectively. Thus, the repeated description thereof is omitted here.

The acquisition unit 62 includes a GPS receiver, a gyroscope, a vehicle speed sensor, and so forth all of which are not shown in FIG. 6. The acquisition unit 62 acquires the present position, traveling direction, traveling speed and so forth of the vehicle 12, namely the vehicle 12 that are carrying the terminal apparatuses 14, based on data supplied from the aforementioned not-shown components of the acquisition unit 62. The present position thereof is indicated by the latitude and longitude. Known art may be employed to acquire them and therefore the description thereof is omitted here. The acquisition unit 62 outputs the thus acquired information to the generator 64.

The control information extraction unit 66 receives the demodulation result fed from the modem unit 54. Of the demodulation result, the control information extraction unit 66 monitors a part of subcarriers corresponding to the identification carrier. If valid data is contained in the part of subcarriers corresponding to the identification carrier, the control information extraction unit 66 will recognize that the control information extraction unit 66 is receiving a slot containing the control information therein. Also, the control information extraction unit 66 establishes the synchronization between frames and slots when the timing with which the slot containing the control information is received is used as a reference. Further, the control information extraction unit 66 acquires information on empty slots and information on collision slots, from the control information. The control information extraction unit 66 also acquires information on the first period and the area determining threshold value, from the control information. The control information extraction unit 66 outputs the information on empty slots and the information on collision slots to the decision unit 80, outputs the information on the first period to the first-period identifying unit 82, and outputs the area determining value to the threshold value specifying unit 84.

The first-period identifying unit 82 receives the information on the first period, from the control information extraction unit 66 and then identifies the first period and the second period in a frame. Identifying the first period and the second period in a frame may be to identify the number of slots contained in the first period. The first-period identifying unit 82 outputs the identified content to the decision unit 80. The threshold value specifying unit 84 receives the area determining threshold value from the control information extraction unit 66 and then stores the area determining threshold value thus received. Also, the threshold value specifying unit 84 outputs the area determining threshold value to the comparison unit 86. The measurement unit 88 receives a received signal of the control information from the RF unit 52 or the modem unit 54 and then measures the received power. The measurement unit 88 outputs the received power to the comparison unit 86.

The comparison unit 86 receives the area determining value from the threshold value specifying unit 84, and also receives the received power from the measurement unit 88. The comparison unit 86 compares the received power against the area determining threshold value. If the received power is larger than the area determining threshold value, the comparison unit 86 will determine the use of the first period. If, on the other hand, the received power is not larger than the area determining threshold value, the comparison unit 86 will determine the use of the second period. The comparison unit 86 outputs the thus determined content to the decision unit 80.

The decision unit 80 receives the content identified by the first-period identifying unit 82, from the first-period identifying unit 82 and also receives the content identified by the comparison unit 86, from the comparison unit 86. Also, the decision unit 80 receives information on empty slots and information on collision slots from the control information extraction unit 66. The decision unit 80 first ascertains whether the first period is to be used or the second period is to be used, based on the information from the comparison unit 86. The decision unit 80 identifies the first period to be used or the second period to be used, based on the information from the first-period identifying unit 82. A description is first given herein of a case where the first period is used.

The decision unit 80 selects one empty slot, based on the information on empty slots. Note that one empty slot may be selected arbitrarily. The decision unit 80 outputs the information on the selected empty slot to the generator 64. The generator 64 receives the information fed from the acquisition unit 62. The generator 64 generates data, based on said information wherein the data is formed as shown in FIG. 5B. Also, the generator 64 receives an instruction on the empty slot from the decision unit 80 and outputs the data to the modem unit 54 using the empty slot associated with the instruction. Note that the processing unit 56 may conduct carrier sense before the data is outputted. For a first period of the next frame, too, the generator 64 outputs the data using the slot of the same slot number.

While such processing continues, the control information extraction unit 66 continues to extract the information on empty slots and the information on collision slots, from the control information, frame by frame. The decision unit 80 checks to see if any of the slot numbers corresponding to the slots in current use is mistakenly taken as a collision slot. If no slot is taken mistakenly as a collision slot, the decision unit 80 will continue to output the same slot numbers as before to the generator 64, based on the information on collision slots. If, on the other hand, any slot is mistakenly taken as a collision slot, the decision unit 80 will select again an empty slot based on the information on empty slots. In other words, another slot, which is different from the slot selected before, is now selected. From then onward, the generator 64 carries out the processing similar to that described above.

The second period is now explained. The processing unit 56 performs carrier sense in a second period. When the result of carrier sense indicates that data can be transmitted, the generator 64 outputs the data to the modem unit 54. The notification unit 70 acquires data sent from another terminal apparatus 14 (not shown) and informs a driver that another vehicle 12 is approaching and so forth. The processing carried out by the notification unit 70 is not limited thereto. The control unit 58 controls the entire operation of the terminal apparatus 14.

Figure 7:
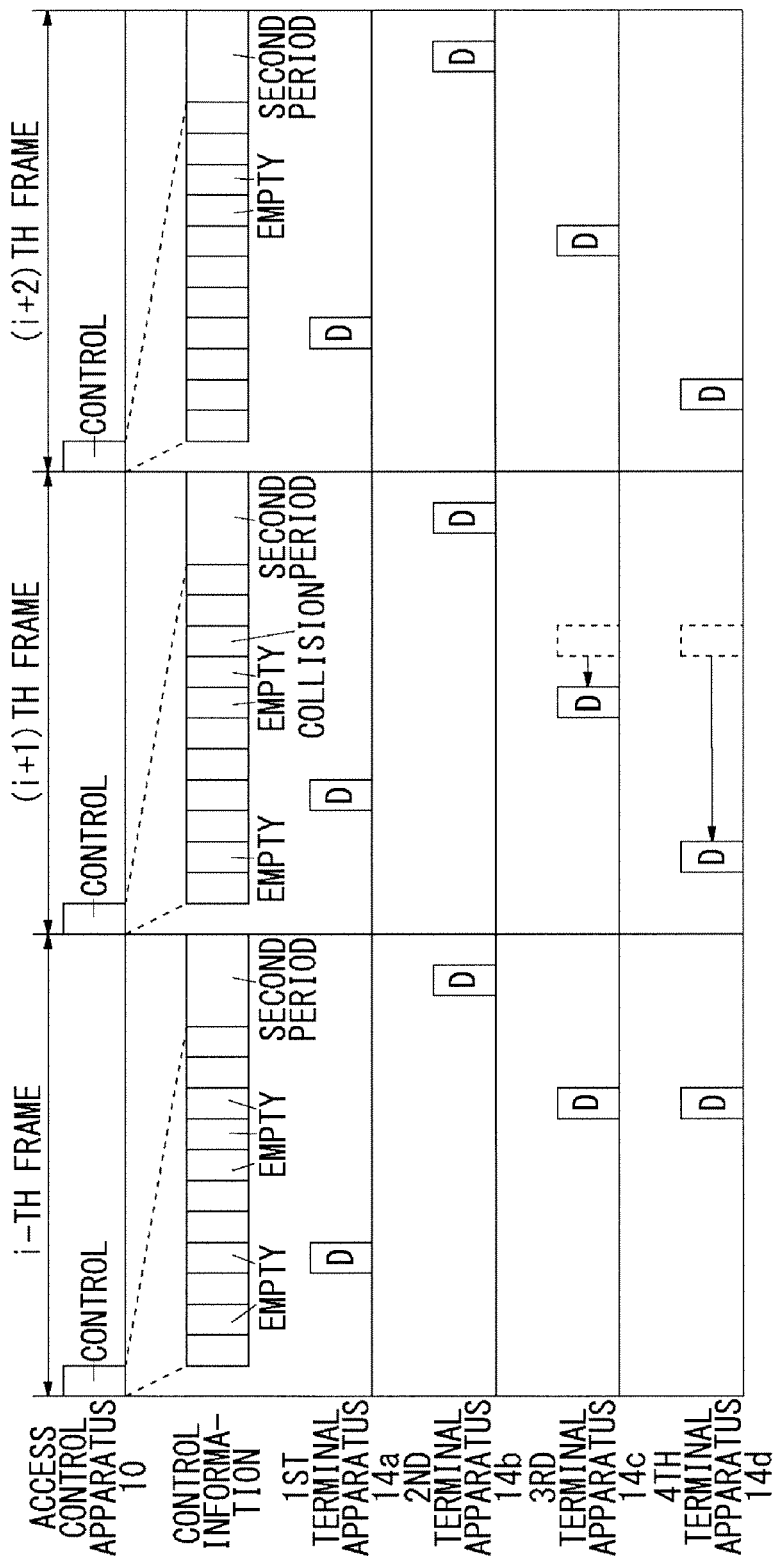
FIG. 7 shows an operational overview of the communication system of FIG. 1.

An operation of the communication system 100 configured as above is now described. FIG. 7 shows an operational overview of the communication system 100. Though the first terminal apparatus 14a to the fourth terminal apparatus 14d are shown in FIG. 7, it is assumed here that there is no relation between those terminal apparatuses 14a to 14d and the first vehicle 12a to the fourth vehicle 12d of FIG. 1. Also, the second terminal apparatus 14b is located in the second area 202 of FIG. 1. The horizontal direction of FIG. 7 corresponds to time, and three frames that are an ith frame to an (i+2)th frame are shown in the top row of FIG. 7. Assume herein for the clarity of description that each frame contains 12 slots and a second period. As shown in FIG. 7, the access control apparatus 10 broadcasts the control information using the leading slot of each frame. "Control" in FIG. 7 indicates control information. Below "control", information on empty slots and information on collision slots both contained in the control information are indicated by associating them with slots. "Empty" in FIG. 7 indicates an empty slot, whereas "collision" in FIG. 7 indicates a collision slot.

In the rows below the top row, the timings with which the first terminal apparatus 14a to the fourth terminal apparatus 14d broadcast the data are indicated. "D" in FIG. 7 means data. The first terminal apparatus 14a, the third terminal apparatus 14c and the fourth terminal apparatus 14d each references the control information and each selects an empty slot. The first terminal apparatus 14a, the third terminal apparatus 14c and the fourth terminal apparatus 14d each broadcasts the data using the selected empty slot in the ith frame. Since the empty slot selected by the third terminal apparatus 14c is identical to the empty slot selected by the fourth terminal apparatus 14d, the data broadcast from them collide with each other. The access control apparatus 10 detects the occurrence of collision in said slot. The control information, broadcast from the access control apparatus 10, in the (i+1)th frame indicates the slot where the collision occurs, as the information on the collision slot. At the same time, second terminal apparatus 14b broadcasts data in the second period, based on CSMA/CA.

Since no collision occurs in the slots which have already been used, the first terminal apparatus 14a use again the slots having the same slot numbers. On the other hand, since collision has occurred in the slots which have already been used, the third terminal apparatus 14c and the fourth terminal apparatus 14d selects another empty slots again. The third terminal apparatus 14c and the fourth terminal apparatus 14d broadcast data, using the selected empty slots. Since no collision occurs in all of data, no collision slot is indicated in the control information, broadcast from the access control apparatus 10, in the (i+2)th frame. Thus, the first terminal apparatus 14a, the third terminal apparatus 14c and the fourth terminal apparatus 14d use again the slots having the same slot numbers as the slots used already.

Figure 8:
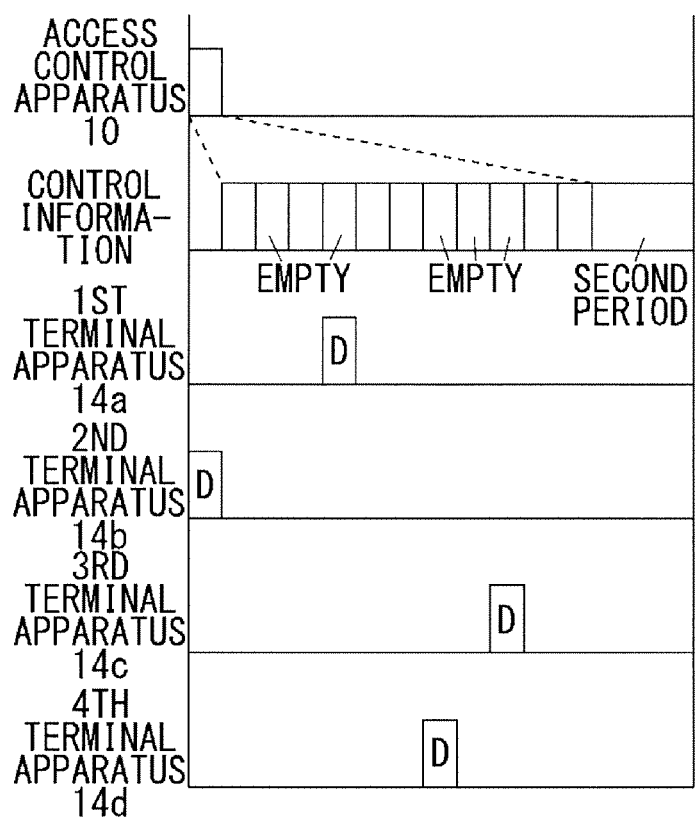
FIG. 8 shows another operational overview of the communication system of FIG. 1.

FIG. 8 is shows another operational overview of the communication system 100. FIG. 8 is represented in a similar manner to FIG. 7. As a precondition in FIG. 8, the second terminal apparatus 14b is incapable of receiving the control information sent from the access control apparatus 10. Thus, the second terminal apparatus 14b transmits data without being aware of the frame construction. The access control apparatus 10 broadcasts the control information, using the leading slot in a frame. At the same time, the second terminal apparatus 14b broadcasts data, using the leading slot in a frame. As a result, the control information and the data collide in said slot. Even though the collision occurs, the first terminal apparatus 14a, the third terminal apparatus 14c and the fourth terminal apparatus 14d can detect the presence of control information by observing the signal components of identification carriers in the control information.

Figure 9:
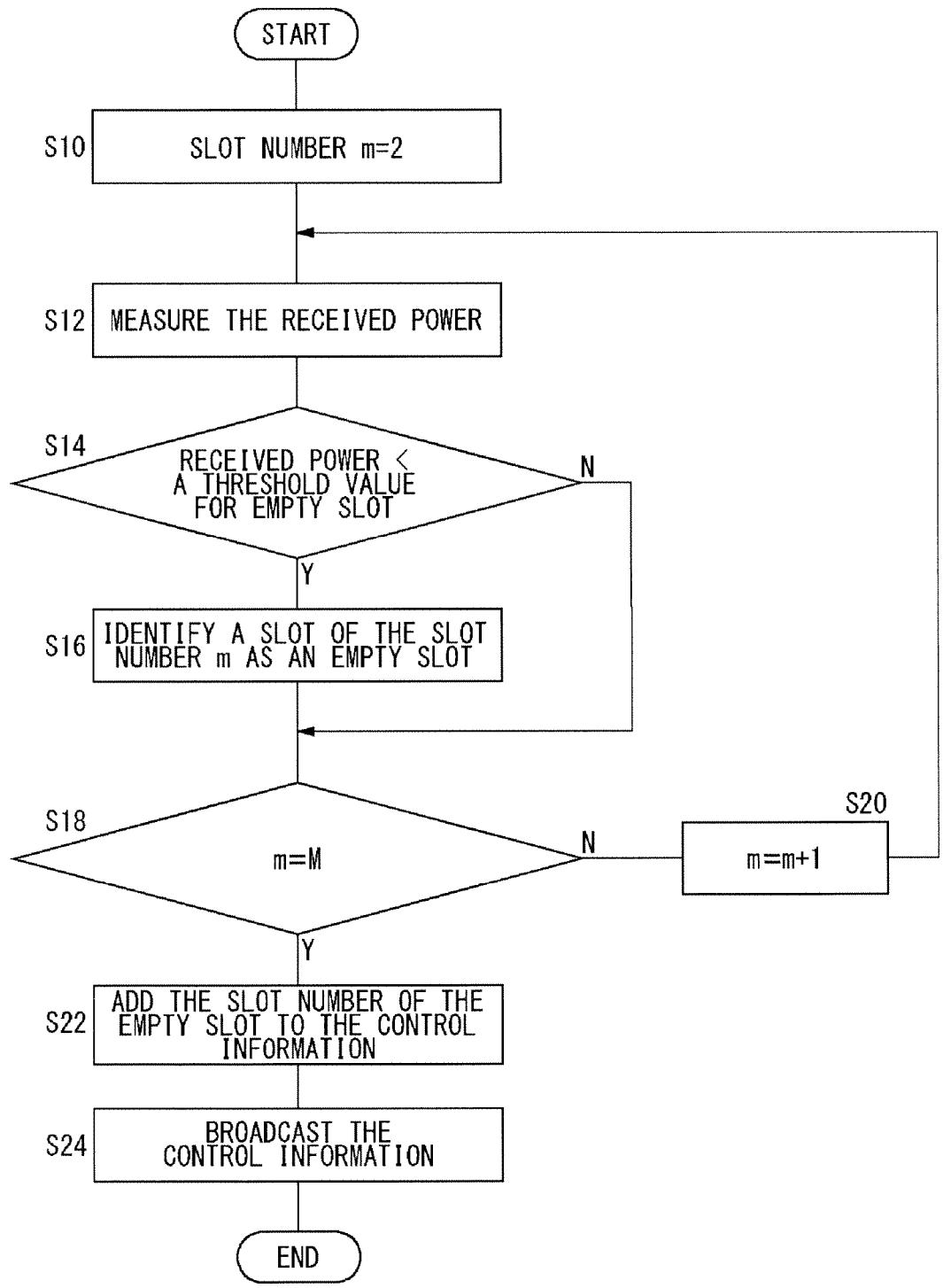
FIG. 9 is a flowchart showing a procedure in which the access control apparatus of FIG. 2 conveys an empty slot.

FIG. 9 is a flowchart showing a procedure in which the access control apparatus 10 conveys an empty slot. A description is given hereinbelow on the assumption that the slots belong to a first period of a frame. The detecting unit 32 sets the slot number m to "2" (S10). The power measuring unit 38 measures the received power (S12). If the received power is less than the threshold value for empty slot (Y of S14), the empty slot identifying unit 42 will identify the slot of the slot number m as an empty slot (S16). If the received power is not less than the threshold value for empty slot (N of S14), the empty slot identifying unit 42 will skip Step S16. If the slot number m is not equal to the maximum number M (N of S18), the detecting unit 32 will increment the slot number m by 1 (S20) and the process will return to Step S12. If, on the other hand, the slot number m is the maximum number M (Y of S18), the generator 36 will add the slot number of the empty slot to the control information (S22). The modem unit 24 and the RF unit 22 broadcast the control information (S24).

Figure 10:
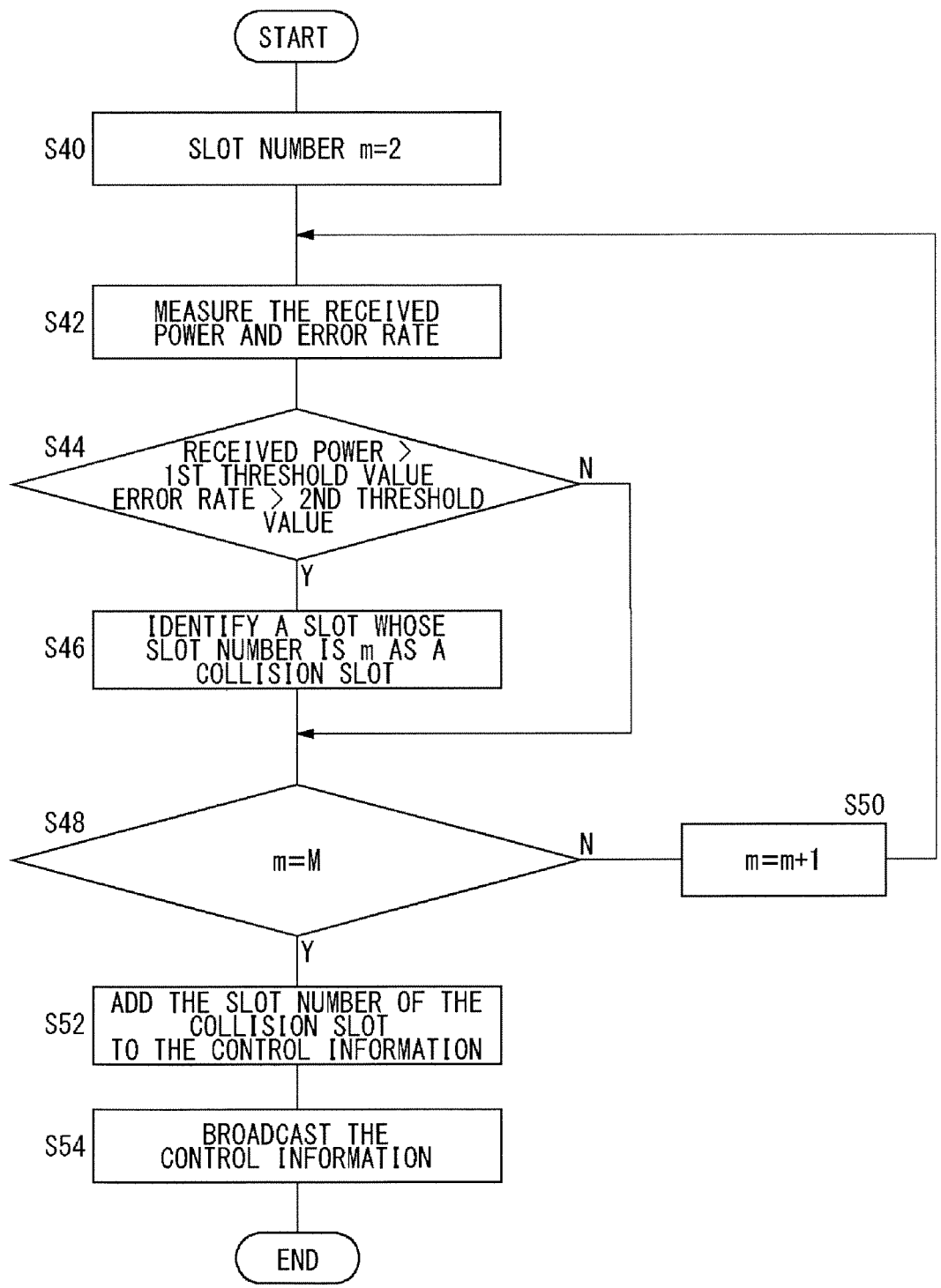
FIG. 10 is a flowchart showing a procedure in which the access control apparatus of FIG. 2 conveys a collision slot.

FIG. 10 is a flowchart showing a procedure in which the access control apparatus 10 conveys a collision slot. It is also assumed herein that the slots belong to a first period of a frame. The detecting unit 32 sets the slot number m to "2" (S40). The power measuring unit 38 measures the received power, and the quality measuring unit 40 measures the error rate (S42). If the received power is greater than the first threshold value and the error rate is greater than the second threshold value (Y of S44), the collision slot identifying unit 44 will identify the slot of the slot number m as a collision slot (S46). If the received power is not greater than the first threshold value or the error rate is not greater than the second threshold value (N of S44), the collision slot identifying unit 44 will skip Step S46. If the slot number m is not equal to the maximum number M (N of S48), the detecting unit 32 will increment the slot number m by 1 (S50) and the process will return to Step S42. If, on the other hand, the slot number m is the maximum number M (Y of S48), the generator 36 will add the slot number of the collision slot to the control information (S52). The modem unit 24 and the RF unit 22 broadcast the control information (S54).

Figure 11:
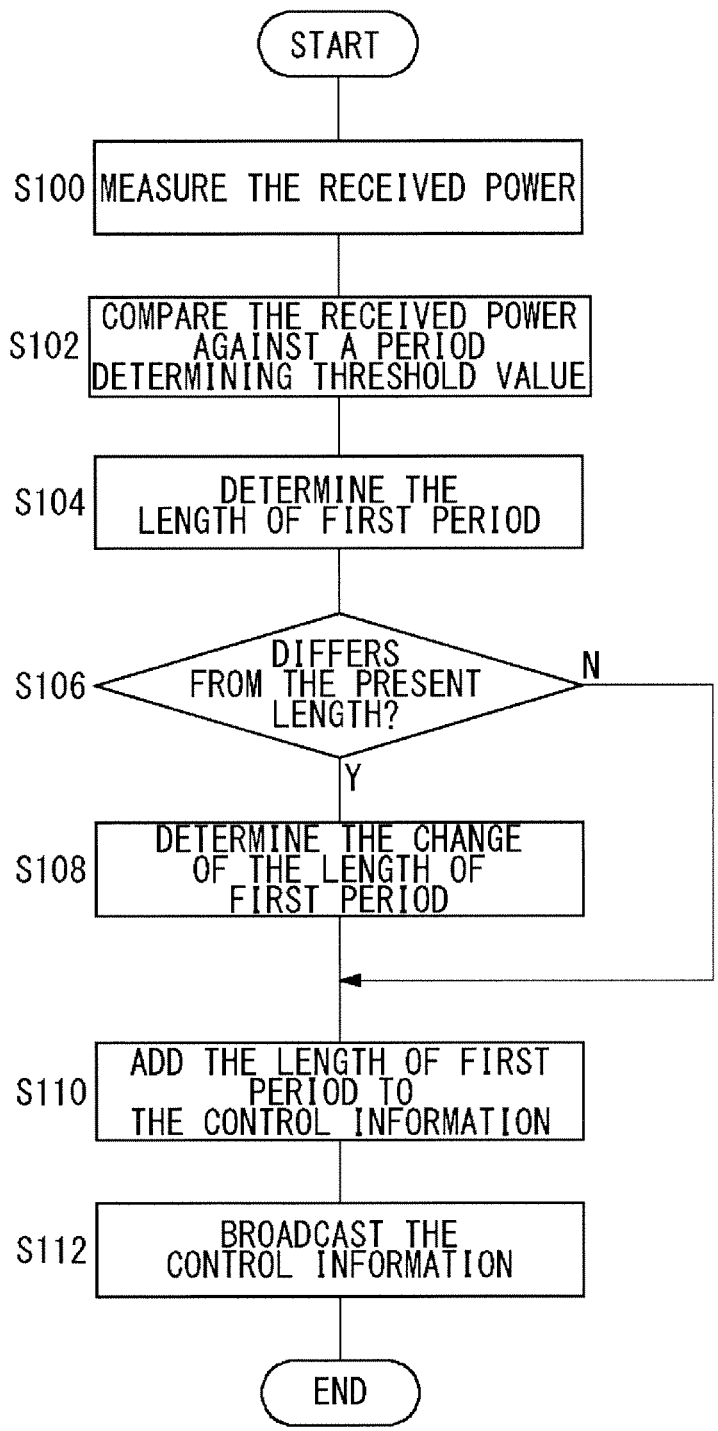
FIG. 11 is a flowchart showing a procedure in which the access control apparatus of FIG. 2 conveys the length of first period.

FIG. 11 is a flowchart showing a procedure in which the access control apparatus 10 conveys the length of first period. The first-period determining unit 48 measures the received power (S100). The first-period determining unit 48 compares the received power against a period determining threshold value (S102) and determines the length of first period (S104). If the length of first period differs from the present length of first period (Y of S106), the first-period determining unit 48 will determine the change of the length of first period (S108). If, on the other hand, the length of first period does not differ from the present length of first period (N of S106), Step S108 will be skipped. The generator 36 adds the length of first period to the control information (S110). The modem unit 24 and the RF unit 22 broadcast the control information (S112).

Figure 12:
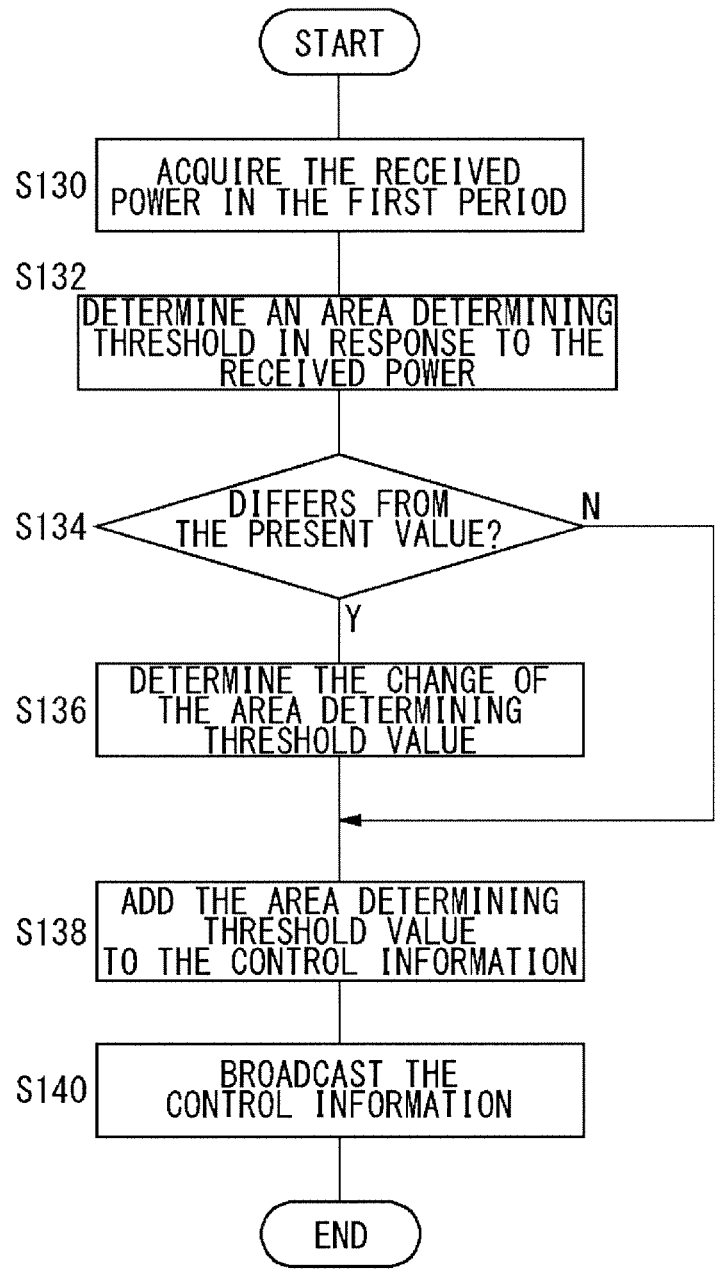
FIG. 12 is a flowchart showing a procedure in which the access control apparatus of FIG. 2 conveys an area determining threshold value.

FIG. 12 is a flowchart showing a procedure in which the access control apparatus 10 conveys an area determining threshold value. The threshold value determining unit 46 acquires the received power in the first period (S130). The threshold value determining unit 46 determines an area determining threshold value according to the received power (S132). If the area determining threshold value differs from the present value (Y of S134), the threshold value determining unit 46 will determine the change of the area determining threshold value (S136). If, on the other hand, the area determining threshold value does not differ from the present value (N of S134), Step S136 will be skipped (S136). The generator 36 adds the area determining threshold value to the control information (S138). The modem unit 24 and the RF unit 22 broadcast the control information (S140).

Figure 13:
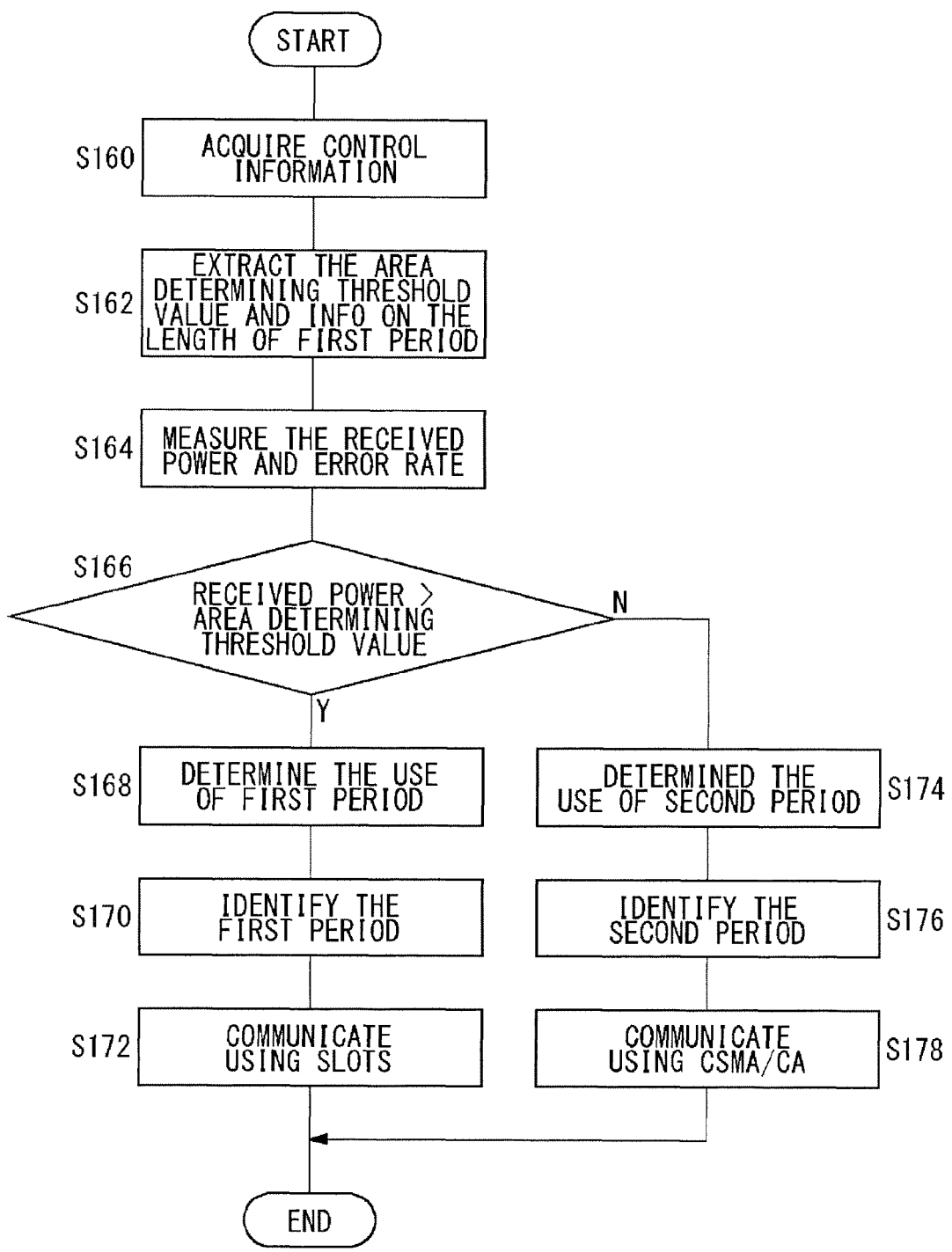
FIG. 13 is a flowchart showing a procedure in which the terminal apparatus of FIG. 6 determines a first period or a second period.

FIG. 13 is a flowchart showing a procedure in which the terminal apparatus 14 determines a first period or a second period. The control information extraction unit 66 acquires the control information (S160). The threshold value specifying unit 84 and the first-period identifying unit 82 extracts information on the area determining threshold value and the length of first period (S162). The measurement unit 88 measures the received power (164). If the received power is larger than the area determining threshold value (Y of S166)), the comparison unit 86 will determine the use of first period (S168). The first-period identifying unit 82 identifies the first period (S170). The decision unit 80 performs communications using slots (S172). If the received power is not larger than the area determining threshold value (N of S166), the comparison unit 86 will determine the use of second period (S174). The first-period identifying unit 82 identifies the second period (S176). The decision unit 80 performs communications using CSMA/CA (S178).

Figure 14:
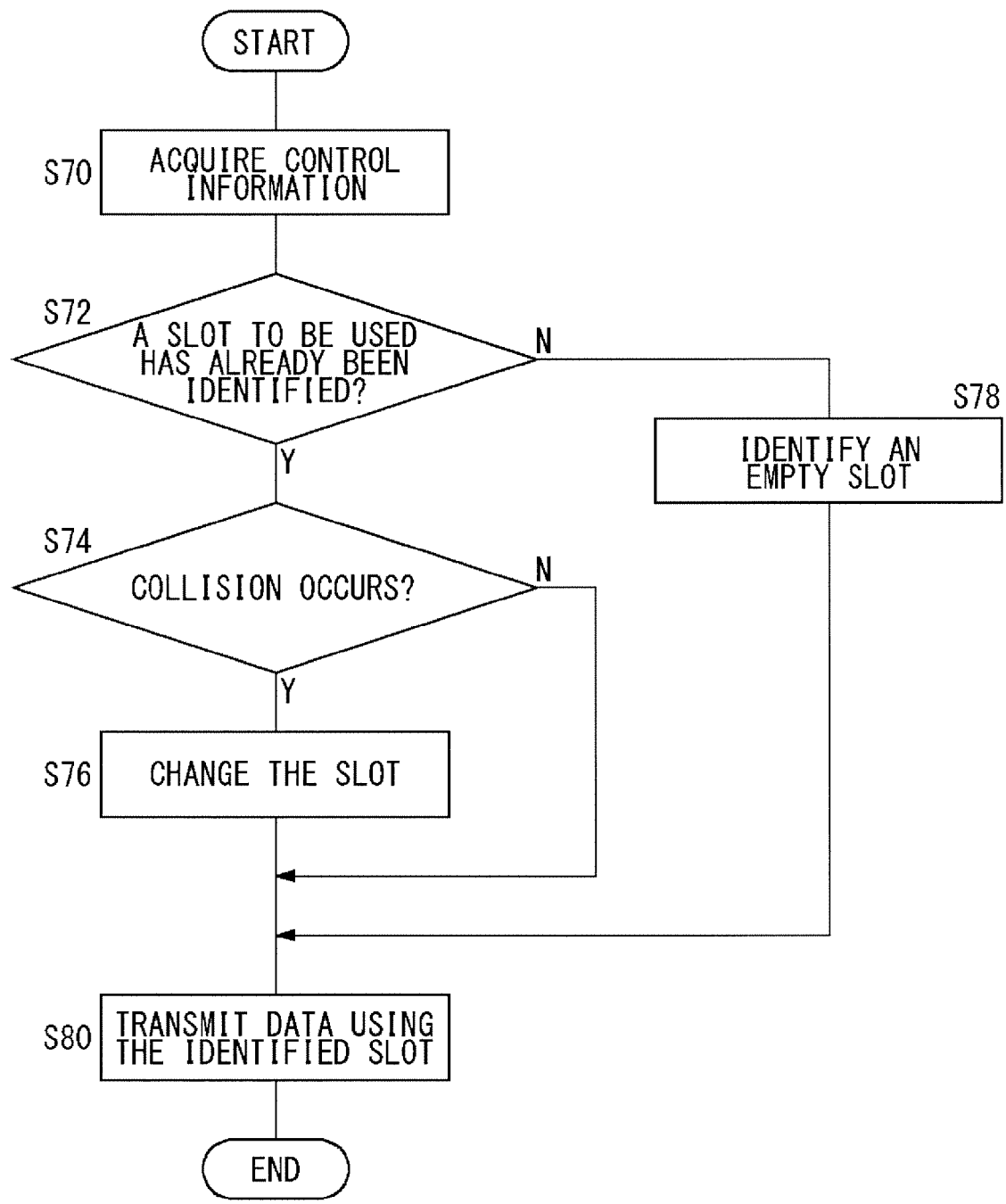
FIG. 14 is a flowchart showing a data transmission procedure performed by the terminal apparatus of FIG. 6.

FIG. 14 is a flowchart showing a data transmission procedure performed by the terminal apparatus 14. FIG. 14 corresponds to Step S170 of FIG. 13. The control information extraction unit 66 acquires the control information (S70). If a slot to be used has already been identified (Y of S72), the decision unit 80 will verify whether collision occurs in this slot or not. If collision occurs (Y of S74), the decision unit 80 will change the slot (S76). If no collision occurs (N of S74), Step S76 will be skipped. If, on the other hand, a slot to be used has not already been identified (N of S72), the decision unit 80 will identify an empty slot (S78). The generator 64 transmits data, using the thus identified slot (S80).

A modification is now described. In the exemplary embodiments, the threshold value determining unit 46 adjusts the magnitude of the area determining threshold value to adjust the size of the first area 200 in FIG. 1. In the modification, the coverage of the first area 200 is added to the control information in order to adjust the size of the first area 200 in FIG. 1. An access control apparatus 10 according to the modification is of the same type as the access control apparatus 10 shown in FIG. 2. The differences from the access control apparatus 10 shown in FIG. 2 will be mainly described hereinbelow.

The threshold value determining unit 46 determines an area containing a terminal apparatus which is to use a plurality of slots in the first period of a frame containing the first period and the second period; hereinafter the information of such a area will be referred to as "area information". For example, the area information is indicated by the radius of a circle with the access control apparatus 10 as the center. In such a case, a certain value is predetermined as the area information, and threshold value determining unit 46 performs such a processing that the size of the area is changed when the length of first period becomes maximum or minimum.

In order achieve the above-described processing, the threshold value determining unit 46 may receive the accumulated value from the first-period determining unit 48. Also, the threshold value determining unit 46 defines beforehand a correspondence between the accumulated values and values of radii of area. The threshold value determining unit 46 determines the radius of area from the received accumulated value, based on said correspondence therebetween. The threshold value determining unit 46 outputs the radius of area to the generator 36 as the area information. Instead of the aforementioned area determining threshold value, the generator 36 adds the area information and the latitude and longitude of a position, where the access control apparatus 10 is installed, to the control information. Hereinafter, the latitude and longitude of a position where the access control apparatus 10 is installed will be referred to as "positional information".

Figure 15:
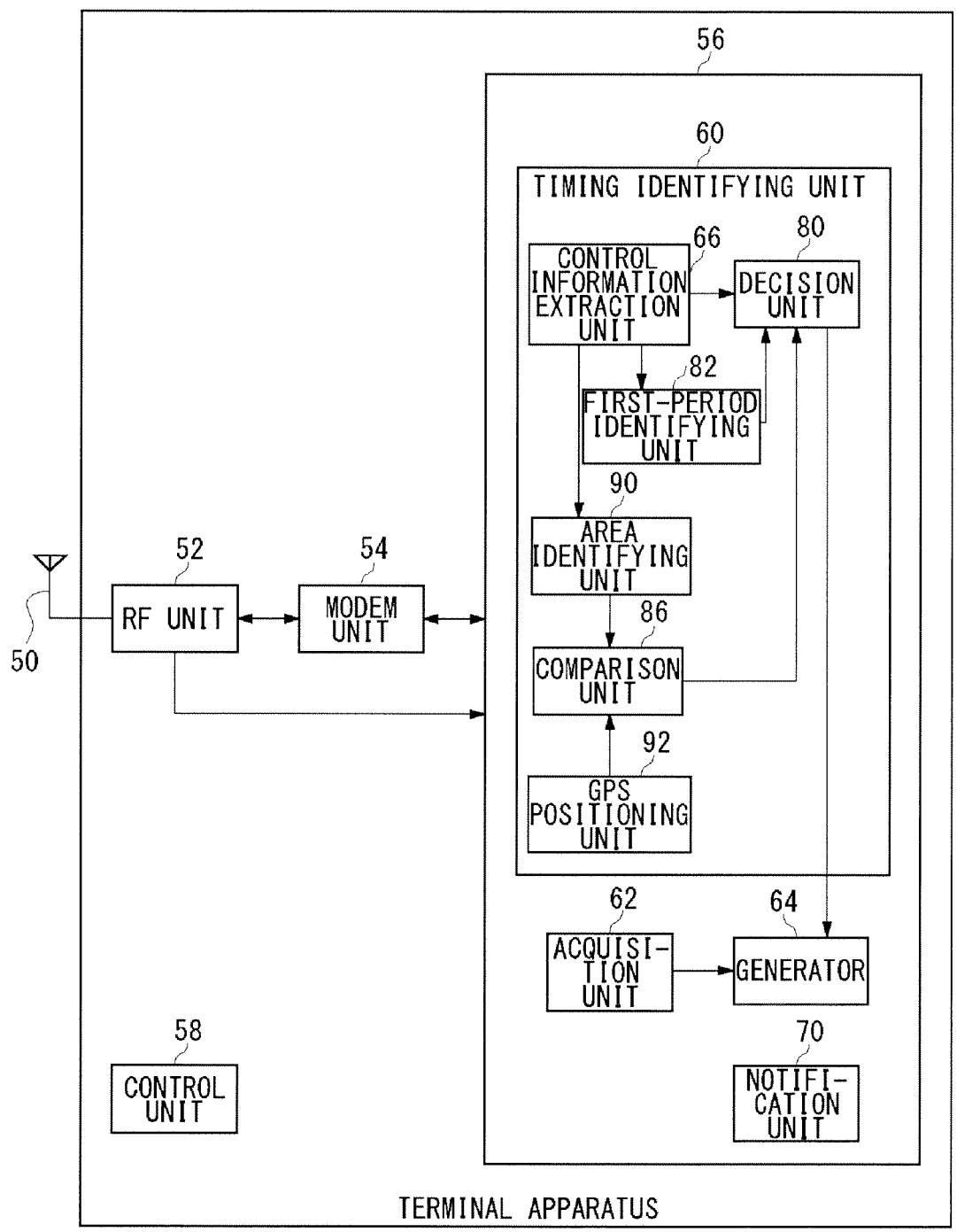
FIG. 15 shows a structure of a terminal apparatus according to a modification of an exemplary embodiment of the present invention.

FIG. 15 shows a structure of a terminal apparatus 14 according to a modification of an exemplary embodiment of the present invention. As compared with the terminal apparatus 14 of FIG. 6, the terminal apparatus 14 of FIG. 15 includes an area identifying unit 90 and a GPS positioning unit 92 in the place of the threshold value specifying unit 84 and the measurement unit 88, respectively. A description is given here centering around features different from those in FIG. 6. The control information extraction unit 66 acquires the area information and the positional information in the place of the area determining threshold value, and outputs these items of information to the area identifying unit 90. The area identifying unit 90 receives the area information and the positional information from the control information extraction unit 66, and stores these items of information.

The GPS positioning unit 92 receives signals from not-shown GPS satellites and acquires the present position of the terminal apparatus 14 based on the received signals. It should be noted that known art can be used for the acquisition of the present position and therefore the description thereof is omitted here. The GPS positioning unit 92 outputs the present position to the comparison unit 86. The comparison unit 86 receives the area information and the positional information from the area identifying unit 90, and also receives the present position from the GPS positioning unit 92. The comparison unit 86 identifies an area containing a terminal apparatus which is to use a plurality of slots in the first period of a frame containing the first period and the second period, based on the area information and the positional information. Also, the comparison unit 86 determines whether the present position is included in the identified area or not. If the present position is included in the identified area, the comparison unit 86 will determine the use of first period. If the present position is not included in the identified area, the comparison unit 86 will determine the use of second period. The comparison unit 86 outputs the thus determined content to the decision unit 80.

By employing the exemplary embodiment of the present invention, the slots usable in communication between a plurality of terminal apparatuses are detected from among a plurality of slots contained in a first period and the thus detected slots are broadcast. Thus, the probability of collisions occurring in communications between the plurality of terminal apparatuses is reduced. Since the probability of collisions in communications between the plurality of terminal apparatuses is reduced, the collision probability of packet signals under conditions of increased volume of communication can be reduced. Since empty slots are identified based on the respective received powers of the plurality of slots, the empty slots can be easily identified. Since the slot number of an empty slot which is contained in a previous frame is broadcast, the instructions to the terminal apparatuses can be executed reliably. Since a terminal apparatus, which is using the empty slot, uses a slot that corresponds to said slot, over a plurality of frames, the processing can be simplified. Also, the access control apparatus does not directly participate in the data communication between terminal apparatuses and only conveys a parameter related to the empty slots. Hence, the structure and operation according to the exemplary embodiments are easily applicable to a communication system premised on CSMA/CA, too.

Also, the slot in which a collision has occurred due to duplicate transmission of signals from the plurality of terminal apparatuses is broadcast from among a plurality of slots contained in a first period. Thus, the probability of collisions occurring in communications between the plurality of terminal apparatuses can be reduced. Also, the collision slots are identified based on the respective received powers of the plurality of slots and the respective signal qualities of the plurality of slots, so that the collision slots can be easily identified. Also, the slot number of a collision slot which is contained in a previous frame is broadcast, so that the instructions to the terminal apparatuses can be executed reliably. Also, the access control apparatus does not directly participate in the data communication between terminal apparatuses and only conveys a parameter related to the collision slots. Hence, the structure and operation according to the exemplary embodiments are easily applicable to a communication system premised on CSMA/CA, too.

Also, since each frame has a second period, a communication may be divided into one having a higher degree of importance and one having a lower degree of importance. Since the communication is divided into a communication of high importance and a communication of low importance, the increase in the collision probability for the communication of high importance is suppressed. Also, the length of first period is adjusted according to the number of terminal apparatuses, so that the first period and the second period can be used effectively. Also, the number of terminal apparatuses is estimated by the received power, so that the number of terminal apparatuses can be easily estimated even though one terminal apparatus is not in direct communication with another terminal apparatus.

Also, the information on a terminal apparatus which is to use a plurality of slots in the first period of a frame containing the first period and the second period is broadcast, so that a plurality of terminal apparatuses can be distributed between the first period and the second period. Since a plurality of terminal apparatuses are distributed between the first period and the second period, the collision probability of packet signals in the first period can be reduced. Also, the area determining threshold value is used as the information on a terminal apparatus which is to use a plurality of slots in the first period of a frame containing the first period and the second period, so that the value can be adjusted easily. Since the area determining threshold value is used, the use of first period or second period can be designated even if a terminal apparatus is not equipped with a measurement function.

Also, the identification carriers in the control information are not used for data, whereas the remaining subcarriers are also used for data. Thus, even if the control information and data signals collide, the presence of the control information can be detected by observing the signal components of the control information. Also, the guard band is provided between the identification carrier and the other subcarriers, so that the interference therebetween can be reduced and the probability of arrival of information transmitted using the identification carrier can be improved. Also, important information is assigned to the identification carrier, so that the probability of arrival of important information can be improved. Also, the UW is assigned to the identification carrier, so that the degree of accuracy in detecting the identification carriers can be improved.

The present invention has been described based on the exemplary embodiments. The exemplary embodiments are intended to be illustrative only, and it is understood by those skilled in the art that various modifications to constituting elements and processes as well as arbitrary combinations thereof could be further developed and that such modifications and combinations are also within the scope of the present invention.

In the exemplary embodiment of the present invention, the control information broadcast from the access control apparatus 10 and the data broadcast from a terminal apparatus 14 are each assigned to a single slot. However, this should not be considered as limiting and, for example, the control information and the data may each be assigned to two or more slots. According to this modification, the transmission rate of control information and data can be increased.

In the exemplary embodiment of the present invention, an identification carrier is equivalent to two subcarriers. Also, the identification carrier is assigned to the subcarriers near the center frequency of an OFDM symbol. However, this should not be considered as limiting and, for example, the identification carrier may be equivalent to more than two subcarriers. For example, the identification carrier may be assigned to subcarriers other than those near the center frequency of an OFDM symbol. According to this modification, the communication system 100 can be designed more freely.

In the exemplary embodiment of the present invention, the first-period determining unit 48 determines the length of first period according to the accumulated value. The exemplary embodiment is not limited thereto and, for example, the first-period determining unit 48 may determine the length of first period according to a ratio of the number of slots detected by the empty slot identifying unit 42 and/or the collision slot identifying unit 44 to the number of slots in the first period. In other words, if the ratio of the number of empty slots to the number of slots in the first period is larger than a threshold value, the first-period determining unit 48 will reduce the length of first period. If, on the other hand, the ratio of the number of empty slots to the number of slots in the first period is not larger than the threshold value or if the ratio of the number of collision slots to the number of slots in the first period is larger than another threshold value, the first-period determining unit 48 will extend the length of first period. Also, similar to the first-period determining unit 48, the threshold value determining unit 46 may determine the area determining threshold value according to a ratio of the number of slots detected by the empty slot identifying unit 42 and/or the collision slot identifying unit 44 to the number of slots in the first period. According to this modification, usable slots are directly checked, so that the degree of accuracy in adjusting the first period and the area determining threshold value can be improved.

In the modification of the exemplary embodiment of the present invention, the terminal apparatus 14 acquires the information on a terminal apparatus which is to use a plurality of slots in the first period of a frame containing the first period and the second period, such as the area determining threshold value or the area information, and then selects the first period or the second period. However, this should not be considered as limiting and, for example, the terminal apparatus 14 may broadcast information on the prohibition of transmission at least in the first period (hereinafter referred to as "prohibition information"). When another terminal apparatus 14 incapable of receiving the control information from the access control apparatus 10 receives the prohibition information, this terminal apparatus 14 stops the transmission over at least the first period. According to this modification, the increase in the collision probability of packet signals in the first period can be suppressed.

In the exemplary embodiment of the present invention, the access control apparatus 10 preferentially adjusts the first period in the first-period determining unit 48 and the threshold value determining unit 46 before it adjusts the area determining threshold value. The exemplary embodiment is not limited thereto and, for example, the access control apparatus 10 may preferentially adjust the area determining threshold value in the first-period determining unit 48 and the threshold value determining unit 46 before it adjusts the first period. According to this modification, the degree of freedom in the designing can be improved.

DESCRIPTION OF THE REFERENCE NUMERALS

10 Access control apparatus
12 Vehicle
14 Terminal apparatus
20 Antenna
22 RF unit
24 Modem unit
26 Processing unit
28 GPS positioning unit
30 Control unit
32 Detecting unit
34 Frame specifying unit
36 Generator
38 Power measuring unit
40 Quality measuring unit
42 Empty slot identifying unit
44 Collision slot identifying unit
46 Threshold value determining unit
48 First-period determining unit
50 Antenna
52 RF unit
54 Modem unit
56 Processing unit
58 Control unit
60 Timing identifying unit
62 Acquisition unit
64 Generator
66 Control information extraction unit
70 Notification unit
80 Decision unit
82 First period identifying unit
84 Threshold value specifying unit
86 Comparison unit
88 Measurement unit
100 Communication system

INDUSTRIAL APPLICABILITY

The present invention reduces the collision probability of packet signals even when the communication volume has increased.

What is claimed is:

1. An access control apparatus for controlling communications between terminal apparatuses, the access control apparatus comprising:
a detecting unit that is adapted to a scheme where a frame, which contains a first period including a plurality of slots for transmission from terminal apparatuses located in a first area around the access control apparatus and a second period for CSMA/CS communication of terminal apparatuses located in a second area outside the first area, is repeated, the detecting unit being further configured to detect an empty slot having received power smaller than a threshold value, from among the plurality of slots in the first period;
a broadcasting unit configured to broadcast information on the empty slot detected by said detecting unit; and
a determining unit configured to determine a length of the first period in the frame, wherein the access control apparatus is configured to control the communications between the terminal apparatuses without directly designating for the terminal apparatuses a slot that is used for data communication even when the terminal apparatuses perform data communication, the determining unit determines the length of the first period such that the larger the number of slots, the longer the first period and the shorter the second period, and the broadcasting unit broadcasts information on the length determined by the determining unit as well as the information on the empty slot.

2. An access control apparatus according to claim 1, further comprising a measurement unit configured to measure the received power of signal in the communications between a plurality of terminal apparatuses, over at least part of the frame, wherein said determining unit determines the length of the first period according to the received power measured by said measurement unit.

3. An access control apparatus according to claim 1, wherein said determining unit determines the length of the first period according to the ratio of the number of slots in the first period to the number of slots detected by said detecting unit.

4. An access control apparatus for controlling communications between terminal apparatuses, the access control apparatus comprising:

a detecting unit that is adapted to a scheme where a frame, which contains a plurality of slots for transmission from terminal apparatuses located in an area around the access control apparatus, is repeated, the detecting unit being further configured to detect an empty slot having received power smaller than a threshold value, from among the plurality of slots in the frame;

a broadcasting unit configured to broadcast information on the empty slot detected by said detecting unit; and a determining unit configured to determine an area determining threshold value for received power, the area determining threshold value being utilized by a terminal apparatus when receiving the information broadcast from the broadcasting unit, wherein the access control apparatus is configured to control the communications between the terminal apparatuses without directly designating for the terminal apparatuses a slot that is used for data communication even when the terminal apparatuses perform data communication, said broadcasting unit broadcasts the area determining threshold value determined by the determining unit, as well as the information on the empty slot, and when received power in the terminal apparatus which receives the information is greater than the area determining threshold value broadcast from the broadcasting unit, the terminal apparatus uses the empty slot.

5. An access control apparatus according to claim 4, wherein the terminal apparatus receiving the information from the broadcasting unit broadcasts at least information on prohibition of transmission so as to at least prohibit transmission to other terminal apparatuses.

6. A broadcasting method employed in an access control apparatus for controlling communications between terminal apparatuses, the method comprising:

detecting, in a scheme where a frame, which contains a first period including a plurality of slots for transmission from terminal apparatuses located in a first area around the access control apparatus and a second period for CSMA/CS communication of terminal apparatuses located in a second area outside the first area, is repeated, an empty slot having received power smaller than a threshold value, from among the plurality of slots in the first period;

broadcasting information on the empty slot detected; and determining a length of the first period in the frame, wherein the access control apparatus is configured to control the communications between the terminal apparatuses without directly designating for the terminal apparatuses a slot that is used for data communication even when the terminal apparatuses perform data communication, the determining determines the length of the first period such that the larger the number of slots, the longer the first period and the shorter the second period, and the broadcasting broadcasts information on the determined length as well as the information on the empty slot.

7. A broadcasting method employed in an access control apparatus for controlling communications between terminal apparatuses, the method comprising:

detecting, in a scheme where a frame, which contains a plurality of slots for transmission from terminal apparatuses located in an area around the access control apparatus, is repeated, an empty slot having received power smaller than a threshold value, from among the plurality of slots in the frame;

broadcasting information on the empty slot detected; and determining an area determining threshold value for received power, the area determining threshold value being utilized by a terminal apparatus when receiving the information broadcast from the broadcasting unit, wherein the access control apparatus is configured to control the communications between the terminal apparatuses without directly designating for the terminal apparatuses a slot that is used for data communication even when the terminal apparatuses perform data communication, said broadcasting broadcasts the area determining threshold value as well as the information on the empty slot, and when received power in the terminal apparatus which receives the information is greater than the broadcast area determining threshold value, the terminal apparatus uses the empty slot.

\* \* \* \* \*